(12) United States Patent
Furihata et al.

(10) Patent No.: US 8,275,603 B2
(45) Date of Patent: Sep. 25, 2012

(54) APPARATUS PERFORMING TRANSLATION PROCESS FROM INPUTTED SPEECH

(75) Inventors: Kentaro Furihata, Kanagawa (JP); Tetsuro Chino, Kanagawa (JP); Satoshi Kamatani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1186 days.

(21) Appl. No.: 11/896,567

(22) Filed: Sep. 4, 2007

(65) Prior Publication Data

US 2008/0091407 A1    Apr. 17, 2008

(30) Foreign Application Priority Data

Sep. 28, 2006 (JP) .................................. 2006-264203

(51) Int. Cl.
*G06F 17/28* (2006.01)
(52) U.S. Cl. ............... 704/4; 704/3; 704/278; 704/277; 704/270; 704/253; 704/235; 704/211; 704/2; 709/204; 705/50; 379/88.01; 379/373.01; 348/468
(58) Field of Classification Search ............... 704/3, 235, 704/270, 277, 4, 278, 253, 211, 2; 709/204; 705/50; 379/88.01, 373.01; 348/368
See application file for complete search history.

(56) References Cited

U.S. PATENT DOCUMENTS

| | | | | |
|---|---|---|---|---|
| 5,214,583 A | * | 5/1993 | Miike et al. ........................ 704/4 |
| 5,671,329 A | * | 9/1997 | Hatazaki ........................ 704/253 |
| 6,246,986 B1 | * | 6/2001 | Ammicht et al. ............. 704/270 |
| 6,292,769 B1 | * | 9/2001 | Flanagan et al. .................. 704/3 |
| 6,321,188 B1 | * | 11/2001 | Hayashi et al. .................... 704/4 |
| 6,697,777 B1 | * | 2/2004 | Ho et al. ......................... 704/235 |
| 6,917,920 B1 | * | 7/2005 | Koizumi et al. ............... 704/277 |
| 7,191,115 B2 | * | 3/2007 | Moore ................................. 704/2 |
| 7,200,550 B2 | * | 4/2007 | Menezes et al. ................ 704/10 |
| 2003/0216912 A1 | | 11/2003 | Chino |
| 2004/0102957 A1 | * | 5/2004 | Levin ................................ 704/3 |
| 2005/0135571 A1 | * | 6/2005 | Bangalore et al. ......... 379/88.01 |
| 2006/0095248 A1 | * | 5/2006 | Menezes et al. .................. 704/3 |
| 2006/0149558 A1 | * | 7/2006 | Kahn et al. ..................... 704/278 |
| 2006/0167992 A1 | * | 7/2006 | Cheung et al. ................ 709/204 |

(Continued)

FOREIGN PATENT DOCUMENTS

JP    4-319769    11/1992

(Continued)

OTHER PUBLICATIONS

Notice of Rejection issued by the Japanese Patent Office on Nov. 25, 2008, for Japanese Patent Application No. 2006-264203, and Partial English Translation thereof.

*Primary Examiner* — Michael Colucci
(74) *Attorney, Agent, or Firm* — Finnegan, Henderson, Farabow, Garrett & Dunner, L.L.P.

(57) ABSTRACT

A speech translating apparatus includes a input unit, a speech recognizing unit, a translating unit, a first dividing unit, a second dividing unit, an associating unit, and an outputting unit. The input unit inputs a speech in a first language. The speech recognizing unit generates a first text from the speech. The translating unit translates the first text into a second language and generates a second text. The first dividing unit divides the first text and generates first phrases. The second dividing unit divides the second text and generates second phrases. The associating unit associates semantically equivalent phrases within each group of phrases. The outputting unit sequentially outputs the associated phrases in a phrase order within the second text.

9 Claims, 15 Drawing Sheets

U.S. PATENT DOCUMENTS

| | | | |
|---|---|---|---|
| 2006/0248012 A1* | 11/2006 | Kircher et al. | 705/50 |
| 2006/0271350 A1 | 11/2006 | Chino et al. | |
| 2007/0127704 A1* | 6/2007 | Marti et al. | 379/373.01 |
| 2007/0188657 A1* | 8/2007 | Basson et al. | 348/468 |
| 2007/0198245 A1 | 8/2007 | Kamatani et al. | |
| 2007/0225973 A1* | 9/2007 | Childress et al. | 704/211 |
| 2008/0077387 A1* | 3/2008 | Ariu | 704/3 |
| 2008/0243474 A1* | 10/2008 | Furihata et al. | 704/2 |

FOREIGN PATENT DOCUMENTS

| | | |
|---|---|---|
| JP | 6-124302 | 5/1994 |
| JP | 7-129594 | 5/1995 |
| JP | 2000-10977 | 1/2000 |
| JP | 2000-29492 | 1/2000 |
| JP | 2001-502828 | 2/2001 |
| JP | 2001-222531 | 8/2001 |
| JP | 2001-325254 | 11/2001 |
| JP | 2003-208196 | 7/2003 |
| JP | 2003-316386 | 11/2003 |
| JP | 2004-38976 | 2/2004 |
| JP | 2004-325848 | 11/2004 |

* cited by examiner

| RULE | JAPANESE | ENGLISH |
|---|---|---|
| 1 | 酒(NOUN)を飲む: SUBJが | drink: SUBJ |
| 2 | 太郎(PROPER NOUN) | Taro |
| 3 | から (POSTPOSITIONAL PARTICLE) | from |
| 4 | 昨晩(NOUN) | last evening |

FIG.5

| PPSET | PP | SOURCE LANGUAGE PHRASE | TARGET LANGUAGE PHRASE |
|---|---|---|---|
| 1 | (1, 1) | (3) 到着してください | (1) Please arrive |
|   | (1, 2) | (2) ヒヤッとホテルに | (2) at Hiya and Hotel |
|   | (1, 3) | (1) 午後3時までに | (3) by 3 p.m. |
| 2 | (2, 1) | (2) ハイハットです | (1) HyhatHotel |
|   | (2, 2) | (1) 駅の近くの | (2) near the station |

{ ADDED AFTER RECEIVING INPUTTED SPEECH 1 : rows (1,1)–(1,3) }

{ ADDED AFTER RECEIVING INPUTTED SPEECH 2 : rows (2,1)–(2,2) }

FIG.9

| INPUT SEQUENCE | INPUTTED SPEECH | SOURCE LANGUAGE TEXT | TARGET LANGUAGE TEXT |
|---|---|---|---|
| 1 | ごごさんじまでにはいはっとほてるにとうちゃくしてください | 午後3時までにヒヤットホテルに到着してください | Please arrive at Hiya and Hotel by 3 p.m. |
| ↓ INTERRUPTION DURING OUTPUT OF PHRASE PAIR SPEECH PPAO (1, 2) ||||
| 1 | えきのちかくのはいはっとほてるです | 駅の近くのハイハットホテルです | HyhatHotel near the station |

FIG.10

| OUTPUTTED PHRASE PAIR SPEECH | OUTPUTTED TARGET LANGUAGE PHRASE SPEECH | OUTPUTTED SOURCE LANGUAGE PHRASE SPEECH |
|---|---|---|
| ↓ OUTPUT CORRESPONDING TO INPUTTED SPEECH 1 | | |
| (1,1) | Please arrive | とうちゃくしてください |
| (1,2) | at Hiya and Hotel | ひやっとほてるに |
| ↓ OUTPUT CORRESPONDING TO INTERRUPTING INPUTTED SPEECH 2 | | |
| (2,1) | HyhatHotel | はいはっとほてるです |
| (2,2) | near the station | えきのちかくの |
| ↓ CONTINUATION OF OUTPUT CORRESPONDING TO INPUTTED SPEECH 1 | | |
| (1,3) | by 3 p.m. | ごごさんじまでに |

FIG.12

| INPUT SEQUENCE | INPUTTED SPEECH | SOURCE LANGUAGE TEXT | TARGET LANGUAGE TEXT |
|---|---|---|---|
| 1 | このかうんたーでえんで はらってもいいですか | このカウンターで円で払っ てもいいですか | May I pay with a circle in this counter ? |
| ↓ INTERRUPTION DURING OUTPUT OF PHRASE PAIR SPEECH PPAO (1, 2) | | | |
| 2 | Circle you mean coin | Circle you mean coin ? | 円って硬貨のことですか? |
| ↓ REPHRASING BY JAPANESE SPEAKER AFTER PHRASE PAIR SPEECH PPAO (2, 2) | | | |
| 3 | いいえにほんえんです | いいえ、日本円です | No, Japanese yen |

FIG.13

| PPSET | PP | SOURCE LANGUAGE PHRASE | TARGET LANGUAGE PHRASE |
|---|---|---|---|
| 1 | (1, 1) | (3)払ってもいいですか | (1) May I pay |
| | (1, 2) | (2)円で | (2) with a circle |
| | (1, 3) | (1)このカウンターで | (3) in this counter ? |
| 2 | (2, 1) | (1)circle | (1) 円って |
| | (2, 2) | (2)you mean coin ? | (2) 硬貨のことですか? |
| 3 | (3, 1) | (1)いいえ、 | (1) No, |
| | (3, 2) | (2)日本円です | (2) Japanese yen |

ADDED AFTER RECEIVING INPUTTED SPEECH 1 — PPSET 1

ADDED AFTER RECEIVING INTERRUPTING INPUTTED SPEECH 2 — PPSET 2

ADDED AFTER RECEIVING REPHRASING INPUTTED SPEECH 3 BY JAPANESE SPEAKER — PPSET 3

FIG.14

| OUTPUTTED PHRASE PAIR SPEECH | OUTPUTTED TARGET LANGUAGE PHRASE SPEECH | OUTPUTTED SOURCE LANGUAGE PHRASE SPEECH |
|---|---|---|
| ↓ OUTPUT CORRESPONDING TO INPUTTED SPEECH 1 | | |
| (1, 1) | May I pay | はらってもいいですか |
| (1, 2) | with a circle | えんで |
| ↓ OUTPUT CORRESPONDING TO INTERRUPTING INPUTTED SPEECH 2 | | |
| (2, 1) | えんって | Circle |
| (2, 2) | こうかのことですか | You mean coin |
| ↓ OUTPUT CORRESPONDING TO INPUTTED SPEECH 3 | | |
| (3, 1) | No | いいえ |
| (3, 2) | Japanese yen | にほんえんです |
| ↓ CONTINUATION OF OUTPUT CORRESPONDING TO INPUTTED SPEECH 1 | | |
| (1, 3) | in this counter | このかうんたーで |

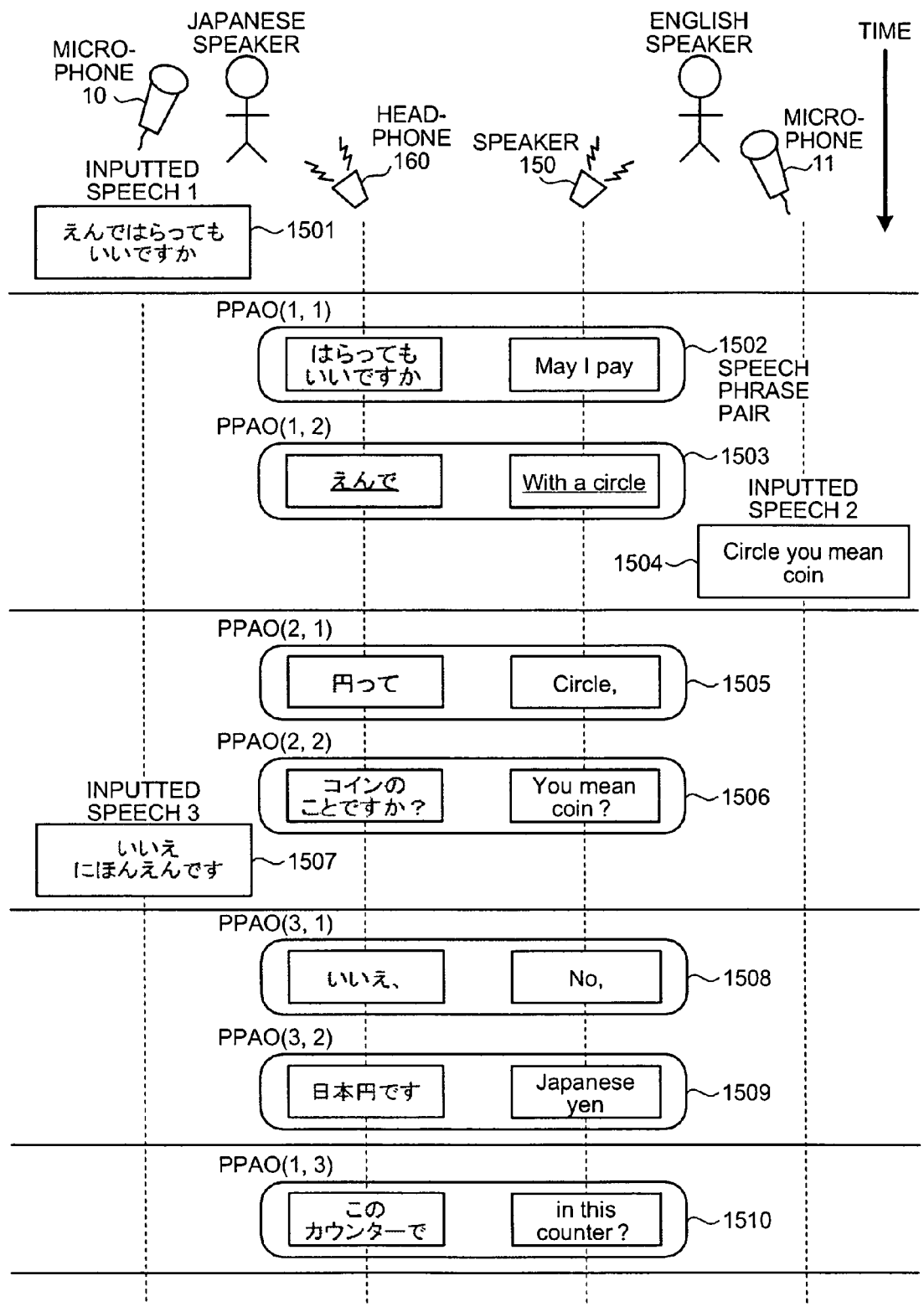

APPARATUS PERFORMING TRANSLATION PROCESS FROM INPUTTED SPEECH

CROSS-REFERENCE TO RELATED APPLICATIONS

This application is based upon and claims the benefit of priority from the prior Japanese Patent Application No. 2006-264203, filed on Sep. 28, 2006; the entire contents of which are incorporated herein by reference.

BACKGROUND OF THE INVENTION

1. Field of the Invention

The present invention relates to a speech translating apparatus, a speech translating method, and a speech translating program product.

2. Description of the Related Art

In recent years, research into elemental technologies including speech recognition, machine translation, and speech synthesis has been progressing. Through combination of speech recognition, machine translation, and speech synthesis, practical application of a speech translation system can be realized. In the speech translation system, when an input of speech in a source language is received, speech in a target language is outputted.

However, numerous technical problems remain in each elemental technology. Therefore, it is difficult to actualize a system with accuracy high enough to always correctly recognize and translate speeches made by a user.

For example, in speech recognition, measures are required against surrounding noise present in an environment in which speech recognition is performed, a sudden pause in the user's speech, and the like. However, it is difficult to completely eliminate errors caused by the surrounding noise, sudden pauses, and the like. Moreover, a correct result cannot be attained if a text including a speech recognition error, such as the errors described above, is mechanically translated.

Furthermore, in mechanical translation, contextual processing technology for performing discriminative translation depending on context remains underdeveloped. As a result, a correct translation cannot always be made.

Therefore, numerous interfaces used to detect errors in speech recognition, mechanical translation, and the like are being proposed. When users converse in real time, the interfaces serve an important role in reducing complicated operations and waiting time required as a result of a system being provided between the users.

For example, a following technology is proposed in JP-A 2000-29492 (KOKAI). A phrase including a recognition error is automatically detected from a text that has been converted from an inputted speech. The detected phrase is presented by text or by speech to a speaker who had made the speech. The speaker corrects the error.

Only the erroneous phrase is presented to the speaker who speaks in a source language. Therefore, work involved with checking a content of an entire speech is reduced. A technology such as this can shorten time required for checking.

However, in the technology described in JP-A 2000-29492, a following series of procedures does not change. A source language speaker speaks. A speech recognition result is audibly outputted. A correction speech made by the user is recognized again. Then, a speech is outputted in a target language. Therefore, a time lag between when the source language speaker speaks and when the speech is transmitted to a speaking partner is long.

Furthermore, although automatic error detection is performed, not all erroneous phrases can be automatically detected. Therefore, the speech in the target language is outputted to the speaking partner without the source language speaker noticing the error, thereby causing a misunderstanding between the source language speaker and the speaking partner.

SUMMARY OF THE INVENTION

According to one aspect of the present invention, a speech translating apparatus includes a input unit that inputs a speech in a first language; a speech recognizing unit that recognizes the speech and generates a first text; a translating unit that translates the first text into a second language and generates a second text; a first dividing unit that divides the first text into first phrases; a second dividing unit that divides the second text into second phrases; an associating unit that associates each of the second phrases with one of the first phrases semantically equivalent to the second phrase; and an output unit that sequentially outputs the second phrase and the first phrase associated with the second phrase by the associating unit in a phrase order within the second text.

According to another aspect of the present invention, a speech translating method includes inputting a speech in a first language; recognizing the speech and generating a first text; translating the first text into a second language and generating a second text; first dividing the first text into first phrases; second dividing the second text into second phrases; associating each of the second phrases with one of the first phrases semantically equivalent to the second phrase; and outputting sequentially the second phrase and the first phrase associated with the second phrase in the associating in a phrase order within the second text.

A computer program product according to still another aspect of the present invention causes a computer to perform the method according to the present invention.

BRIEF DESCRIPTION OF THE DRAWINGS

FIG. 5 is a diagram of a first example of a data structure of data held in a phrase storing unit according to the embodiment;

FIG. 9 is a diagram of a first example of inputted speeches inputted into the speech translating apparatus according to the embodiment, and source language texts and target language texts generated from the inputted speeches;

FIG. 10 is an explanatory diagram of a first example of a sequence in which the speech translating apparatus according to the embodiment outputs phrase pairs;

FIG. 12 is a diagram of a second example of the inputted speeches inputted into the speech translating apparatus according to the embodiment, and the source language texts and the target language texts generated from the inputted speeches;

FIG. 13 is a diagram of a second example of the data structure of the data held in the phrase storing unit according to the embodiment;

FIG. 14 is an explanatory diagram of a second example of the sequence in which the speech translating apparatus according to the embodiment outputs the phrase pairs;

FIG. 15 is a time chart diagram according to a second example indicating the inputted speeches received by the speech translating apparatus according to the embodiment and the outputted speech phrase pairs.

DETAILED DESCRIPTION OF THE INVENTION

Figure 1:
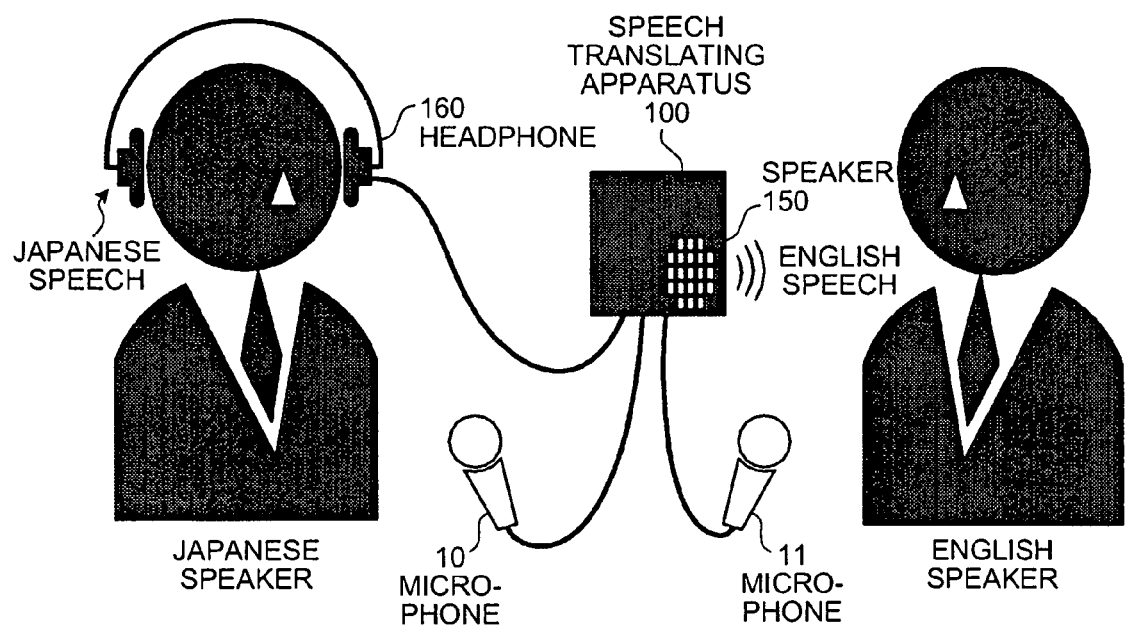
FIG. 1 is an explanatory diagram of a conceptual situation in which a speech translating apparatus according to an embodiment is used.

Exemplary embodiments of the present invention are below described with reference to the attached drawings. As shown in FIG. 1, a Japanese speaker speaks into a microphone 10 and listens to a Japanese speech outputted from a headphone 160. An English speaker speaks into a microphone 11 and listens to an English speech outputted from a speaker 150 provided in a speech translating apparatus 100.

For example, when the Japanese speaker speaks in Japanese, the speech translating apparatus 100 recognizes a spoken speech and translates the speech into English. Then, the speech translating apparatus 100 outputs the translated English speech from the speaker 150. Furthermore, during the output of the English speech, the speech translating apparatus 100 outputs a result of speech recognition performed on the speech made by the Japanese speaker. The result is outputted to the headphone 160 in Japanese. The Japanese speaker can check for speech recognition errors by listening to a Japanese speech outputted from the headphone 160.

In other words, the Japanese speaker can listen to the Japanese speech corresponding to the English speech currently being outputted to the English speaker and check for any errors.

If the Japanese speaker finds an error, the Japanese speaker can speak and interrupt the speeches being outputted from the speech translating apparatus 100 to correct the error for the English speaker. Then, when the speech translating apparatus 100 receives an input of an interrupting speech while outputting the speeches, the speech translating apparatus 100 preferentially outputs the interrupting speech over the translated English speech.

Then, after the speech translating apparatus 100 outputs a speech that is a translation of the interrupting speech, the speech translating apparatus 100 resumes outputting original speeches that were being outputted before the interruption. The original speeches are outputted from a point of interruption. The Japanese speaker is not required to repeat a same content. As a result, usability is enhanced.

When Japanese speech and English speech are simultaneously outputted using a conventional technology, even when an interruption is made immediately, the interruption may often not be pertinent because word orders differ between Japanese and English. Therefore, in the speech translating apparatus 100 according to the embodiment, a process is performed so that word orders of outputted speeches correspond even between different languages. As a result, misunderstandings and other problems do not occur regardless of when the Japanese speaker and the English speaker interrupt the speeches being outputted. The process will be described in detail, hereafter.

The present embodiment will be described using an example in which the English speaker and the Japanese speaker are conversing. However, languages are not limited thereto. All other natural languages, such as German, French, and Chinese, can also be used.

Figure 2:
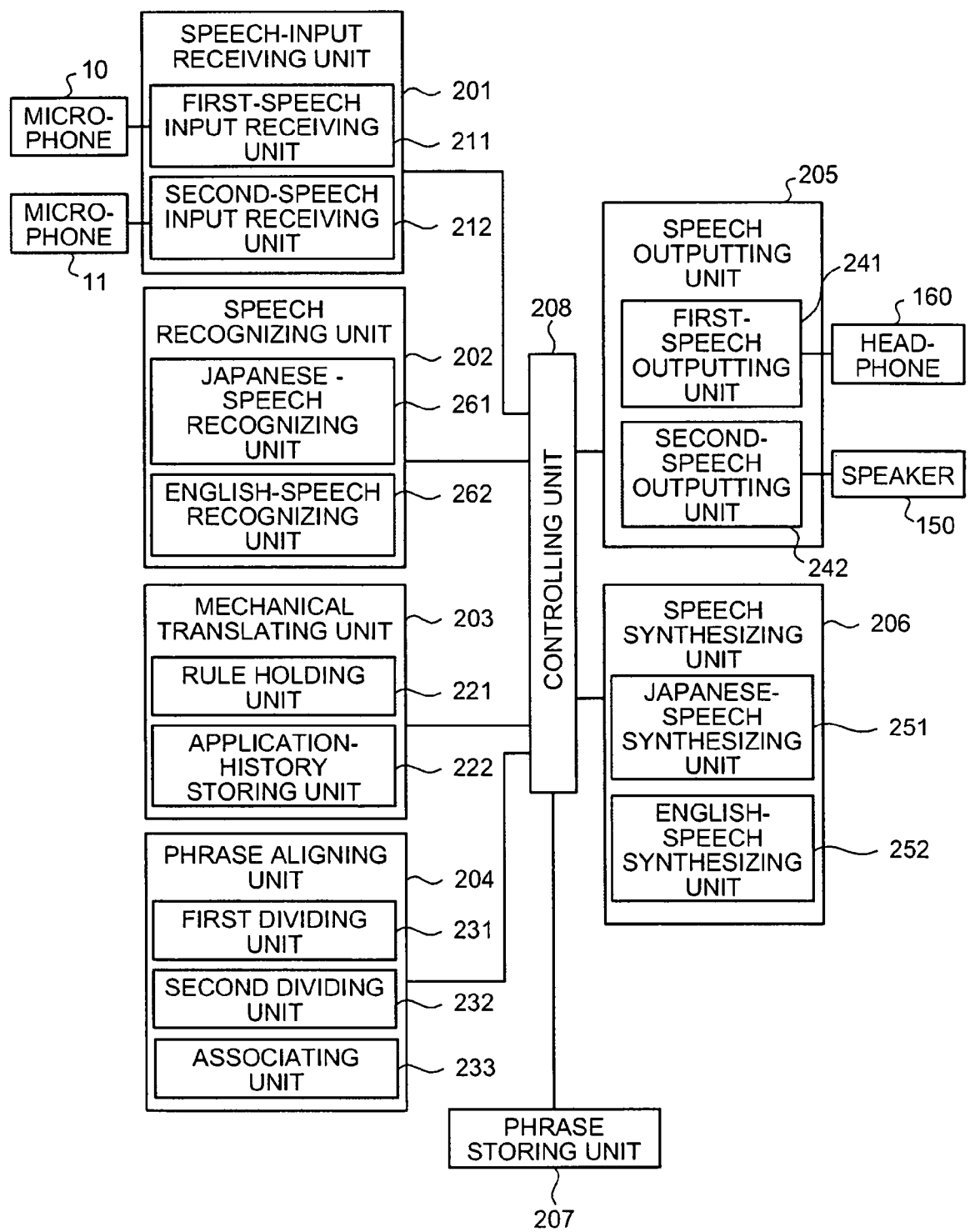
FIG. 2 is a block diagram of a configuration of the speech translating apparatus according to the embodiment.

As shown in FIG. 2, the speech translating apparatus 100 includes a speech-input receiving unit 201, a speech recognizing unit 202, a mechanical translating unit 203, a phrase aligning unit 204, a speech synthesizing unit 206, a speech outputting unit 205, a phrase storing unit 207, and a controlling unit 208.

The controlling unit 208 controls the overall speech translating apparatus 100 and, for example, gives an instruction to each component. Details of the controlling unit 208 will be described hereafter.

The speech-input receiving unit 201 includes a first speech-input receiving unit 211 and a second speech-input receiving unit 212. The speech-input receiving unit 201 receives an input of a speech in a language to be translated, according to an instruction from the controlling unit 208. The speech-input receiving unit 201 converts the speech into a digital signal in a pulse-code modulation (PCM) format or the like, using a known analog-to-digital conversion method.

An input unit includes the microphones 10 and 11, and speech-input receiving unit 201.

The first speech-input receiving unit 211 receives an input of a speech made by the Japanese speaker through the microphone 10. The first speech-input receiving unit 211 converts the speech into a digital signal using the above-described method. Then, the first speech-input receiving unit 211 outputs the digital signal to a Japanese-speech recognizing unit 261 in the speech recognizing unit 202, described hereafter.

The second speech-input receiving unit 212 receives an input of a speech made by the English speaker through the microphone 11. The second speech-input receiving unit 212 converts the speech into a digital signal using the above-described method. Then, the second speech-input receiving unit 212 outputs the digital signal to an English-speech recognizing unit 262 in the speech recognizing unit 202, described hereafter.

The speech-input receiving unit 201 waits for the speeches from the Japanese speaker and the English speaker using the first speech-input receiving unit 211 and the second speech-input receiving unit 212. If one speech-input receiving unit detects an inputted speech from the speaker, the speech-input receiving unit 201 stops receiving the speech from the speaker using the other speech-input receiving unit. The speech-input receiving unit 201 performs an input process on only the detected inputted speech.

The speech recognizing unit 202 includes the Japanese-speech recognizing unit 261 and the English-speech recognizing unit 262. The speech recognizing unit 202 performs a speech recognition process on the digital signal inputted from the speech-input receiving unit 201, using a known signal analysis method and a known language analysis method. The speech recognizing unit 202 generates a text written in the speaker's language (referred to, hereinafter, as a source language text S).

According to the embodiment, a source language is a language before translation that is used by one speaker. A target language is a language after translation that can be used by another speaker. In other words, the speech translating apparatus 100 translates the speech in the source language into the target language. According to the embodiment, an example is mainly described in which the source language is Japanese and the target language is English.

The Japanese-speech recognizing unit 261 performs the speech recognition process on a speech signal inputted from the first speech-input receiving unit 211 and generates a text written in Japanese.

The English-speech recognizing unit 262 performs the speech recognition process on a speech signal inputted from the second speech-input receiving unit 212 and generates a text written in English.

The mechanical translating unit 203 includes a rule holding unit 221 and an application-history storing unit 222. The mechanical translating unit 203 performs a translation process on the source language text S inputted from the speech recognizing unit 202 and generates a text written in the target language (referred to, hereinafter, as a target language text T).

For example, if the source language text S is written in Japanese, the mechanical translating unit 203 generates the target language text T written in English. If the source language text S is written in English, the mechanical translating unit 203 generates the target language text T written in Japanese. In this way, the mechanical translating unit 203 generates the target language text T semantically equivalent to the source language text S.

The mechanical translating unit 203 generates the target language text T from the source language text S using a lexicon and structural conversion rules held in the rule holding unit 221. Any method, including known methods, can be used as a conversion method for converting the source language text S into the target language text T.

The mechanical translating unit 203 holds the structural conversion rules in the application-history storing unit 222 as a translation-rule application history H. The structural conversion rules are used when the mechanical translating unit 203 converts a case structure obtained through an analysis of the source language text S into a structure of the target language.

Figures 3, 4:
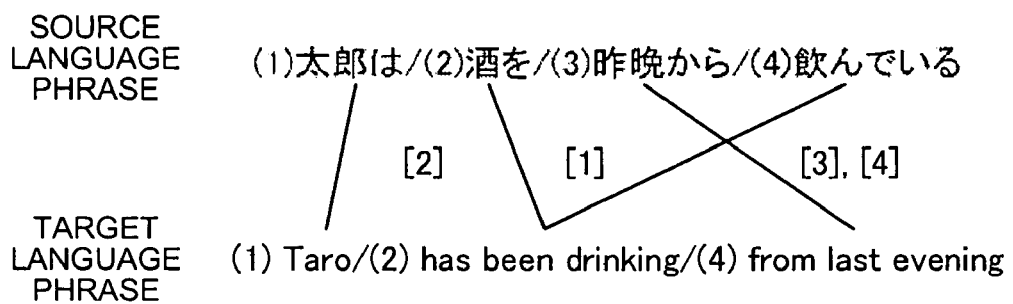
FIG. 3 is a diagram of an example of a translation-rule application history stored in an application-history storing unit according to the embodiment.
FIG. 4 is an explanatory conceptual diagram of an alignment performed by an associating unit according to the embodiment.

As shown in FIG. 3, the translation-rule application history H holds translation rules used when the source language text S is converted into the target language text T.

The mechanical translating unit 203 outputs the translation-rule application history H to the phrase aligning unit 204, in addition to the source language text S and the target language text T.

The phrase aligning unit 204 includes a first dividing unit 231, a second dividing unit 232, and an associating unit 233. The phrase aligning unit 204 divides the source language text S and the target language text T into phrases of a predetermined length and associates the phrases.

The first dividing unit 231 divides the source language text S into the phrases and generates a source language phrase group.

The second dividing unit 232 divides the target language text T into the phrases and generates a target language phrase group.

A single phrase according to the embodiment is a clause including one or more content words and zero or more function words. According to the embodiment, the phrase is not limited to the clause. The phrase can also be a different processing unit.

The associating unit 233 associates (aligns) each target language phrase TP with a source language phrase SP semantically equivalent to the target language phrase TP.

In FIG. 4, the source language text S is "(1)太郎は/(2)酒を/(3)昨晩から/(4)飲んでいる。".The target language text T is "(1)Taro/(2)has been drinking/(3)from last evening". "/" within the texts indicates a break between phrases. Numbers indicate a sequence starting from the beginning.

The associating unit 233 associates phrases including a corresponding word, based on the inputted translation-rule application history H.

First, rule 1 in the translation-rule application history H shown in FIG. 3 indicates that "酒を飲む"is converted into "drink". The associating unit 233 associates a source language (Japanese) phrase SP (2) and a source language (Japanese) phrase SP (4) with a target language (English) phrase TP (2). If a plurality of source language phrases SP is associated with a single target language phrase TP, the associating unit 233 groups the source language phrases SP into one in this way. For example, the associating unit 233 groups the source language phrase SP (2) "酒を"and the source language phrase SP (4) "飲んでいる"into "酒を飲んでいる" as shown in FIG. 3.

Similarly, the associating unit 233 associates a source language phrase SP (1) "太郎は" and a target language phrase TP (1) "Taro" based on rule 2. The associating unit 233 also associates a source language phrase SP (3) "昨晩から" and a target language phrase TP (3) "from last evening" based on rule 3.

Rule 4 in the translation-rule application history H indicates an association between "昨晩" and "last evening". However, the phrases are already associated based on rule 3. Therefore, the associating unit 233 does not perform a process using rule 4.

As a result, the associating unit 233 generates a phrase pair set PPSET including three phrase pairs PP: [(1)Taro, (1) 太郎は], [(2)has been drinking, (2)酒を (4)飲んでいる], and [(3)from last evening, (3) 昨晩から].

A phrase pair PP is a pair of associated target language phrase TP and source language phrase SP. The phrase pair set PPSET is a group of phrase pairs PP generated from a sentence inputted by a single speech or the like.

The phrase storing unit 207 holds the phrase pair set PPSET inputted from the phrase aligning unit 204.

As shown in FIG. 5, the phrase storing unit 207 associates a phrase pair set PPSET number, a phrase pair PP number, a source language phrase SP, and a target language phrase SP and holds the associated phrase pair set PPSET number, phrase pair PP number, source language phrase SP, and target language phrase TP.

As shown in FIG. 5, the phrase storing unit 207 holds three phrase pairs PP as a phrase pair set PPSET 1. The phrase pairs PP are: PP (1, 1) [(1)Please arrive, (3)到着してください], PP (1, 2) [(2) at Hiya and Hotel, (2)ヒヤッとホテルに], and PP (1, 3) [(3) by 3 p.m., (1)午後3時までに].

The phrase pair set PPSET number indicates a level of an interrupting speech. For example, the phrase pair set PPSET 1 indicates a phrase pair set PPSET from a first level speech. A phrase pair set PPSET 2 indicates a phrase pair set PPSET from a speech interrupting an output of the phrase pair set PPSET 1.

The phrase pair PP number indicates (the phrase pair set PPSET number, a sequence in which the target language phrase TP appears within the target language text T). The sequence in which the target language phrase T appears within the target language text T is held because the phrase pair PP is required to be outputted without the sequence of the target language phrases TP being interchanged. In other words, each phrase pair PP is outputted depending on the sequence in which the target language phrases TP appear. The process will be described in detail, hereafter.

The speech synthesizing unit 206 includes a Japanese-speech synthesizing unit 251 and an English-speech synthesizing unit 252. The speech synthesizing unit 206 synthesizes a digital signal expressing a waveform of a reading voice for each phrase according to an instruction from the controlling unit 208. The synthesis is performed in a sequence assigned in advance by the phrase storing unit 207.

The Japanese-speech synthesizing unit 251 synthesizes a digital signal expressing a waveform of a Japanese reading voice from a phrase in Japanese. If the source language is Japanese, the Japanese-speech synthesizing unit 251 synthesizes the digital signal from the source language phrase SP. If the source language is English, the Japanese-speech synthesizing unit 251 synthesizes the digital signal from the target language phrase TP.

The English-speech synthesizing unit 252 synthesizes a digital signal expressing a waveform of an English reading voice from a phrase in English. If the source language is Japanese, the English-speech synthesizing unit 252 synthesizes the digital signal from the target language phrase TP. If the source language is English, the English-speech synthesizing unit 252 synthesizes the digital signal from the source language phrase SP.

The speech outputting unit 205 includes a first-speech outputting unit 241 and a second-speech outputting unit 242. After the digital signal inputted from the speech synthesizing unit 206 is converted by a known digital-to-analog conversion method, the speech outputting unit 205 outputs the converted signal as speech. The speech outputting unit 205 also sequentially outputs the target language phrases TP in a phrase sequence within the target language text T and the source language phrases SP associated with the target language phrases TP as speech. The phrase sequence is the sequence in which the phrases appear in a text.

The first-speech outputting unit 241 converts the digital signal inputted from the Japanese-speech synthesizing unit 251 and outputs the speech to the headphone 160. The second-speech outputting unit 242 converts the digital signal inputted from the English-speech synthesizing unit 252 and outputs the speech to the speaker 150.

Next, a process performed from when the speech translating apparatus 100 according to the embodiment receives the speech input to when the speech translating apparatus outputs the speech will be described with reference to FIG. 6.

First, the controlling unit 208 sets a counter variable i to an initial value '1' (Step S601). Next, the speech-input receiving unit 201 receives an inputted speech SAI1 (Step S602). If the inputted speech SAI1 is not inputted (No at Step S602), the speech-input receiving unit 201 waits for the input. '1' of SAI1 is a value of the counter variable i.

When the speech-input receiving unit 201 receives the inputted speech SAI1 (Yes at Step S602), the speech-input receiving unit 201 generates a phrase pair set PPSETi corresponding to an inputted speech SAIi (Step S603). The process will be described in detail hereafter.

Next, the controlling unit 208 assigns the initial value '1' to a pointer Ji (Step S604).

Then, the controlling unit 208 judges whether the pointer Ji is larger than a phrase-pair total element number Ni (Step S605). The phrase-pair total element number Ni indicates a total number of phrase pairs included in the phrase pair set PPSETi being processed.

When the controlling unit 208 judges that the pointer Ji is smaller than the phrase-pair total element number Ni (No at Step S605), the controlling unit 208 sets a speech interrupt flag to 'False' (Step S606).

Then, a phrase pair PP (i, Ji) is audibly outputted (Step S607). If the input of the interrupting speech is received during the process, the controlling unit 208 sets the speech interrupt flag to 'True'. The process will be described in detail, hereafter.

Next, the controlling unit 208 increases the pointer Ji by '1' (Step S608). The pointer Ji indicates the sequence of the target language phrases TP within the target language text T. In other words, because the pointer Ji is increased by '1', the target language phrases TP and the like are audibly outputted in the phrase sequence within in the target language text T.

Then, the controlling unit 208 judges whether the speech interrupt flag is 'True' (Step S609). When the speech interrupt flag is 'False' (No at Step S609), the process is restarted from the judgment of whether the pointer Ji is larger than the phrase-pair total element number Ni (Step S605).

When the speech interrupt flag is 'True' (Yes at Step S609), the controlling unit 208 increases the counter variable i by '1' (Step S610). Then, the controlling unit 208 again generates the phrase pair set PPSETi from the interrupting speech (Step S603).

When the controlling unit 208 judges that the pointer Ji is larger than the phrase-pair total element number Ni (Yes at Step S605), the process using the phrase pair set PPSETi is considered completed and the phrase pair set PPSETi is deleted (Step S611).

Then, the controlling unit 208 decreases the counter variable i by '1' (Step S612). The controlling unit 208 judges whether the counter variable i is less than '1' (Step S613). When the controlling unit 208 judges the counter variable i to be equal to or more than '1' (No at Step S613), the controlling unit 208 again judges whether the pointer Ji is larger than the phrase-pair total element number Ni (Step S605).

When the controlling unit 208 judges the counter variable i to be less than '1' (Yes at Step S613), the controlling unit 208 completes the process.

By performing the process from when the speech input is received to when the speech is outputted using the above-described procedures, the speech translating apparatus 100 according to the embodiment can recursively process the phrase pair set PPSETi.

As a result, when the inputted speech is interrupted, processing of the interrupted original speech can be resumed after the interrupting speech is preferentially processed.

Figure 7:
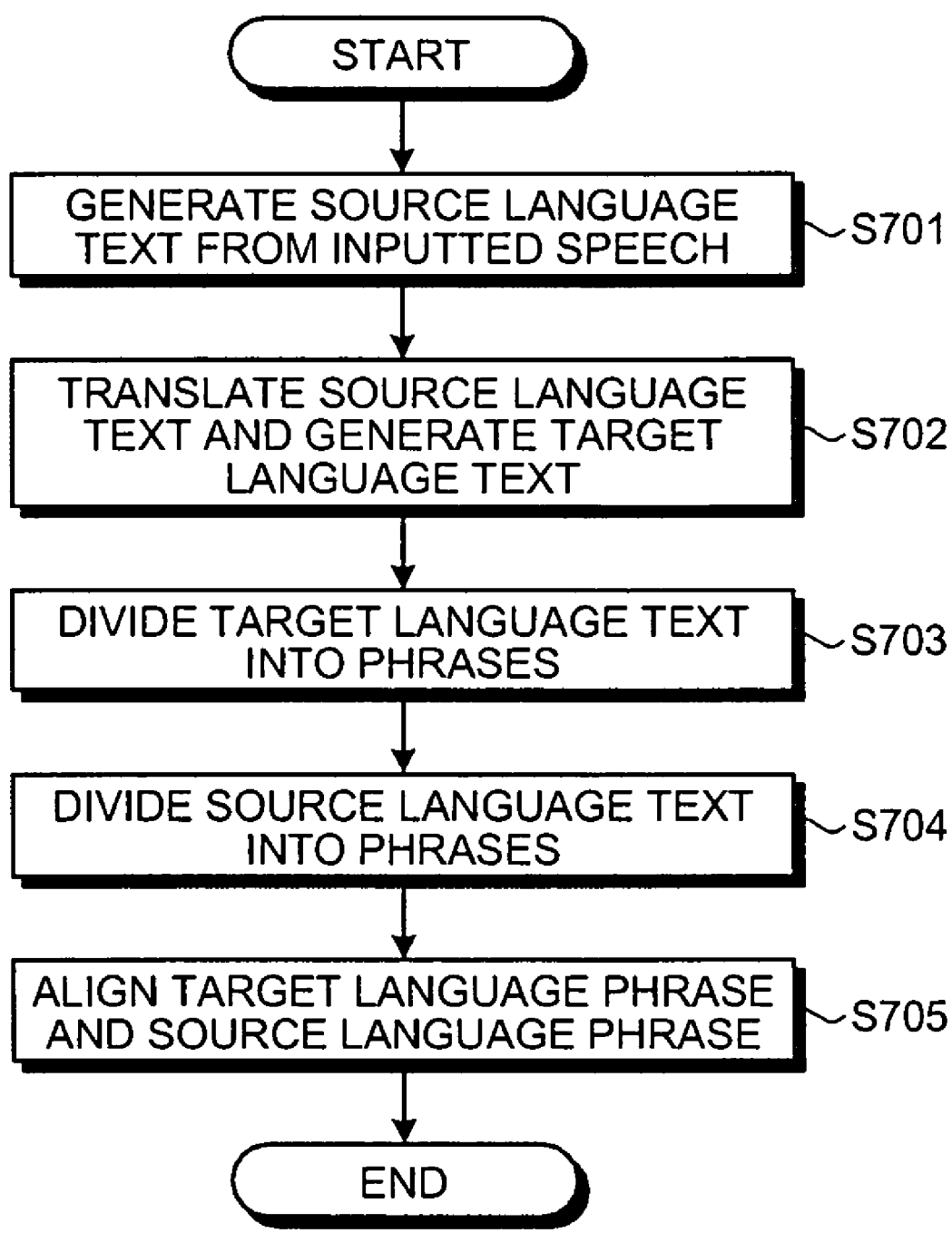
FIG. 7 is a flowchart performed until when a phrase pair set is generated, when the speech translating apparatus according to the embodiment has received the inputted speech

Next, a process performed when the speech translating apparatus 100 has received the inputted speech SAIi will be described with reference to FIG. 7. The process is performed until a phrase alignment is performed and the phrase pair set PPSETi is generated.

First, the speech recognizing unit 202 recognizes the inputted speech SAIi inputted from the speech-input receiving unit 201 and generates a source language text Si (Step S701). If the source language of the inputted speech SAIi is Japanese, the Japanese-speech recognizing unit 261 generates a source language text Si. If the source language of the inputted speech SAIi is English, the English-speech recognizing unit 262 generates the source language text Si.

Then, the mechanical translating unit 203 mechanically translates the source language text Si and generates a target language text Ti (Step S702).

Next, the first dividing unit 231 divides the source language text Si into the phrases (Step S703). The second dividing unit 232 divides the target language text Ti into the phrases (Step S704).

The associating unit 233 aligns the target language phrases TP and the source language phrases SP and generates the phrase pair set PPSETi (Step S705). The phrase aligning unit 204 stores the generated phrase pair set PPSETi in the phrase storing unit 207.

Next, procedures performed when the speech translating apparatus 100 according to the embodiment audibly outputs the phrase pair PP (i, Ji) will be described with reference to FIG. 8. An example in which the target language is English and the source language is Japanese will be described, hereafter.

First, the English-speech synthesizing unit 252 reads the target language phrase TP within the phrase pair PP (i, Ji) from the phrase storing unit 207. The English-speech synthesizing unit 252 synthesizes the read target language (English) phrase TP and generates a target language phrase speech signal TPAO (Step S801).

Next, the Japanese-speech synthesizing unit 251 reads the source language phrase SP within the phrase pair PP (i, Ji) from the phrase storing unit 207. The Japanese-speech synthesizing unit 251 synthesizes the read source language (Japanese) phrase and generates a source language phrase speech signal SPAO (Step S802).

The second-speech outputting unit 242 outputs the generated target language phrase speech signal TPAO to the speaker 150 (Step S803).

Next, the first-speech outputting unit 241 outputs the generated source language phrase speech signal SPAO to the headphone 160 (Step S804).

The speech-input receiving unit 201 detects whether a speaker had made an interrupting speech (Step S805). The speaker can be the Japanese speaker or the English speaker.

When the speech-input receiving unit 201 does not detect the interrupting speech (No at Step S805), the controlling unit 208 judges whether the output of the speeches is completed (Step S807). When the controlling unit 208 judges that the output of the speeches is not completed (No at Step S807), the speech synthesis is continued (Step S801).

When the controlling unit 208 judges that the output of the speeches is completed (Yes at Step S807), the process is completed.

If the speech-input receiving unit 201 detects an inputted speech SAIi+1 that is a result of the interruption (Yes at Step S805), the controlling unit 208 interrupts the output of the target language phrase speech signal TPAO from the second-speech outputting unit 242 and the output of the source language phrase speech signal SPAO from the first-speech outputting unit 241 (Step S808).

Then, the controlling unit 208 sets the speech interrupt flag to 'True' (Step S809). As a result, the process is completed.

Next, the process above will be described in detail using a specific example. In the example, the Japanese speaker speaks first. While the speech translating apparatus 100 is audibly outputting the speech, a speech recognition error occurs in the speech. The Japanese speaker interrupts the output.

As shown in FIG. 9, first, the first speech-input receiving unit 211 receives the inputted speech SAI1 "ごごさんじまでにはいはっとほてるにとうちゃくしてください" from the Japanese speaker. Then, the first speech-input receiving unit 211 receives an input of an inputted speech "えきのちかくのはいはっとほてるです" from the Japanese speaker as an interruption.

Furthermore, FIG. 9 shows the source language text S and the target language text T generated from the inputted speech by the speech translating apparatus 100. In input sequence 1, an example is given in which an error occurs in the speech recognition performed by the Japanese-speech recognizing unit 261. "はいはっとほてる" is recognized as "ヒヤッとホテル". As a result, the mechanical translating unit 203 translates "ヒヤッとホテル" into "Hiya and Hotel" in the target language text T.

Furthermore, in the example, the Japanese speaker notices the error in the speech recognition during the output of the speech. The Japanese speaker interrupts the output with an inputted speech SAI2 "えきのちかくのはいはっととてるです" shown in input sequence 2.

The phrase pair set PPSETi generated as a result is as shown in FIG. 5. The interruption by the above-described inputted speech SAI2 is received while a phrase pair PP (1, 2) is being outputted.

Then, the speech translating apparatus 100 outputs the phrase pairs PP in the phrase pair set PPSETi shown in FIG. 5 in a sequence shown in FIG. 10.

Figure 11:
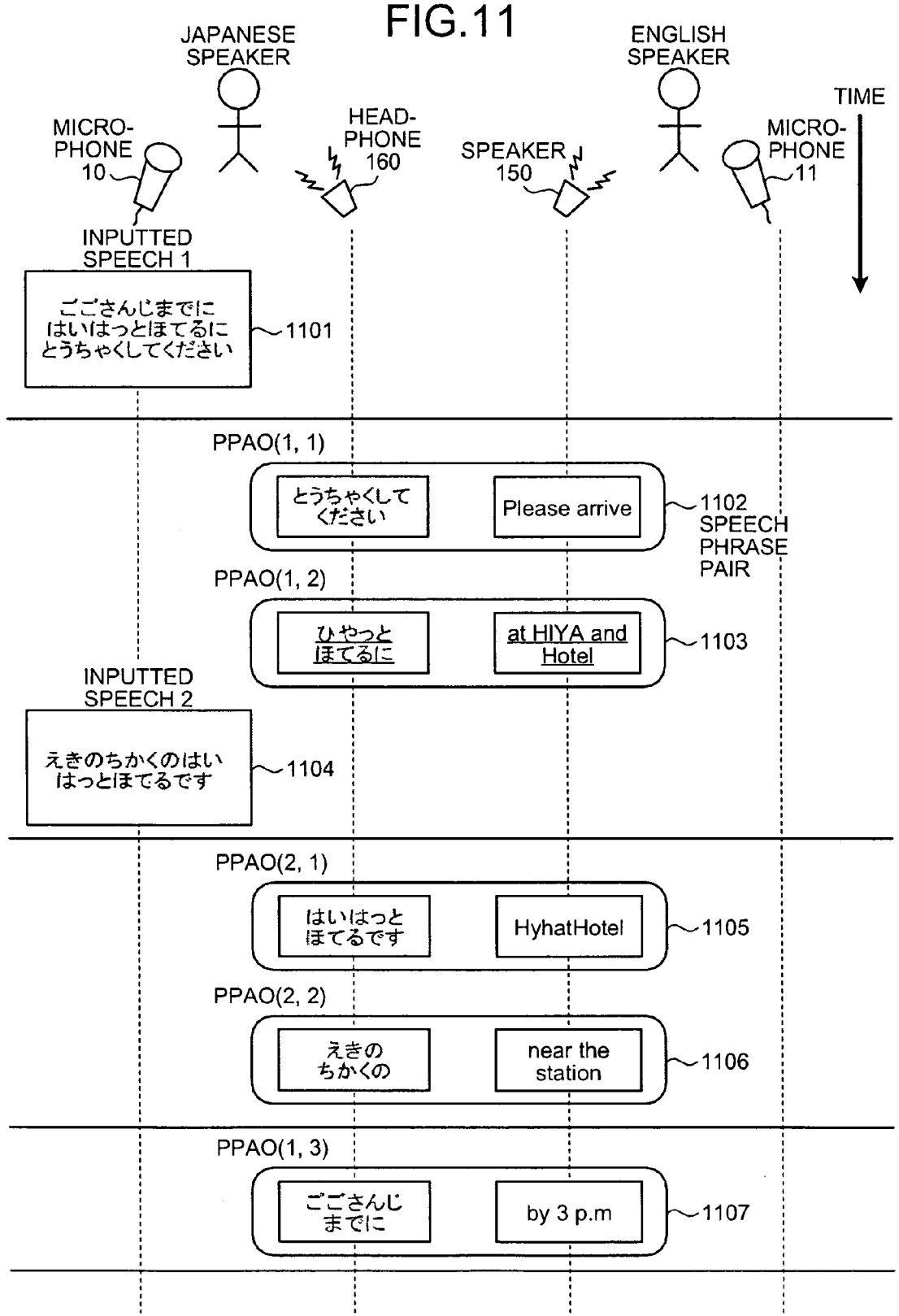
FIG. 11 is a time chart diagram according to a first example indicating the inputted speeches received by the speech translating apparatus according to the embodiment and outputted speech phrase pairs.

Next, procedures performed to output a phrase pair PP speech based on a time chart shown in FIG. 11 is described with reference to FIG. 6.

First, the controlling unit 208 sets the counter variable i to '1' at Step S601. The counter variable i indicates an interruption level to an original speech. In other words, the uninterrupted original speech is a first level. A speech interrupting the original speech is a second level. A speech interrupting the second level speech is at a third level, and so on.

In other words, the controlling unit 208 sets the counter variable i to '1' to receive the input of an initial uninterrupted speech.

Then, at Step S602, the speech-input receiving unit 201 waits for speeches from the Japanese speaker and the English speaker. The speech-input receiving unit 201 receives the input of only the speech from the speaker detected first.

In the example, the first speech-input receiving unit 211 detects a first speech from the Japanese speaker and stops receiving input from the English speaker. As indicated by reference number 1101 in FIG. 11, the Japanese speaker inputs the inputted speech SAI1 "ごごさんじまでにはいはっとほてるにとうちゃくしてください" (午後3時までにハイハットホテルに到着してください) into the microphone 10. As a result, the first speech-input receiving unit 211 receives the inputted speech SAI1 at Step S602.

Figure 6:
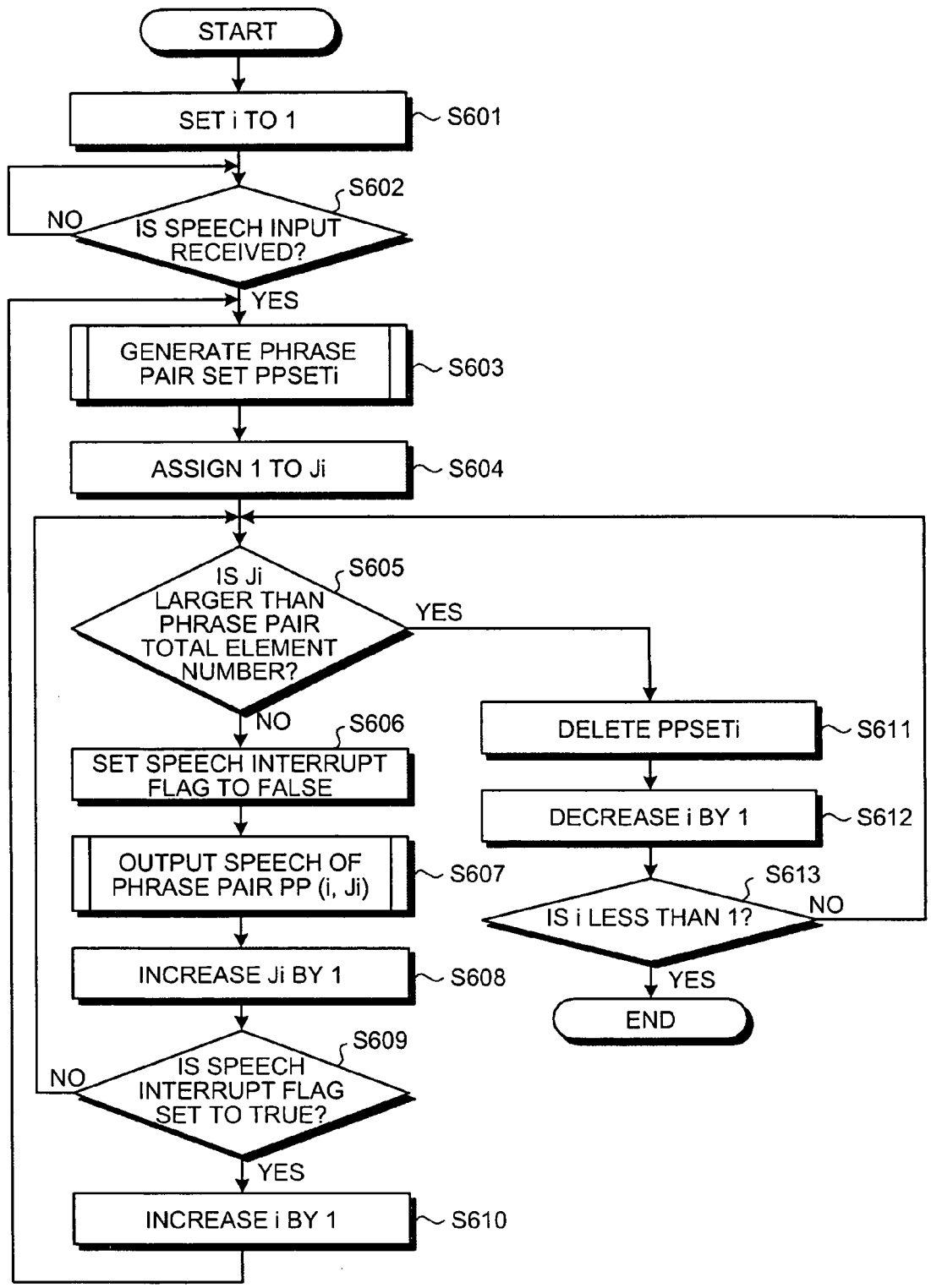
FIG. 6 is a flowchart performed from when a speech in a source language is inputted to when an speech in a target language is outputted.

At Step S603 in FIG. 6, a set (PPSET1) of phrase pairs (PP) including the source language phrase SP and the target language phrase TP is generated. The process performed to generate the phrase pair set PPSET1 is described in detail in FIG. 7.

First, at Step S701, the speech recognizing unit 202 generates the source language text S from the inputted speech SAI1. At this time, a recognition error occurs and a "はいはっとほてるに" portion is recognized as "ヒヤッとホテルに". As a result, the speech recognizing unit 202 generates a source language text S1 "午後3時までにヒヤッとホテルに到着してください".

At Step S702, the mechanical translating unit 203 generates a target language text T1 "Please arrive at Hiya and Hotel by 3 p.m." from the source language text S1. Because the recognition error "ヒヤッとホテルに" has occurred at Step S702, the mechanical translating unit 203 translates what should correctly be "at Hyhat Hotel" as "at Hiya and Hotel".

Next, at Step S703, the second dividing unit 232 divides the target language text T1 into phrases. At S704, the first dividing unit 231 divides the source language text S1 into phrases. Then, at Step 705, the associating unit 233 generates the phrase pair set PPSET1 in which the phrases are associated and stores the generated phrase pair set PPSET1 in the phrase storing unit 207.

The stored phrase pair set PPSET1 will be described with reference to FIG. 5. The phrase pair set PPSET1 includes the phrase pair PP (1, 1), the phrase pair PP (1, 2), and the phrase pair PP (1, 3).

Each phrase pair PP includes the target language phrase TP and the source language phrase SP. For example, the phrase pair PP (1, 1) includes a source language phrase SP (1, 1) "到着してください" and a target language phrase TP (1, 1) "Please arrive". In this way, a same subscript as that of the corresponding phrase pair PP is attached to the target language phrase TP and the source language phrase SP.

Similarly, the phrase pair PP (1, 2) is [(2) at Hiya and Hotel, (2)ヒヤッとホテルに], and the phrase pair PP (1, 3) is [(3) by 3 p.m., (1)ルに], After the phrase pair set PPSETi is generated in this way, the controlling unit 208 returns to the process in FIG. 6. The controlling unit 208 sets the pointer J1 to '1' at Step S604. The pointer Ji indicates that the phrase pair PP (i, Ji) will be audibly outputted next.

Then, at Step S605, the controlling unit 208 judges whether the pointer Ji is larger than the phrase-pair total element number Ni. In other words, the controlling unit 208 judges whether the phrase pair PP (i, Ji) is present in the phrase storing unit 207. The controlling unit 208 compares the value '1' of the pointer Ji with a phrase-pair total element number '3' of the phrase pair set PPSETi. In other words, the controlling unit 208 judges that J1 is less than the phrase-pair total element number (No at Step S605). The speech translating apparatus 100 starts a process at Step S606 to output the phrase pair PP (1, 1).

Next, at Step S606, the controlling unit 208 sets the speech interrupt flag to 'False'. The speech interrupt flag indicates whether the speaker has made the interrupting speech during the audio output of the phrase pair PP at Step S607, described hereafter.

At Step S607, the target language phrase TP "Please arrive" in the phrase pair PP (1, 1) is outputted to the English speaker. The source language phrase SP "到着してください" is outputted to the Japanese speaker. The details of the procedure at Step S607 will be described with reference to FIG. 8.

First, at Step S801, the English-speech synthesizing unit 252 generates a speech signal from the target language phrase TP (1, 1) "Please arrive". Then, at Step S802, the Japanese-speech synthesizing unit 251 generates a speech signal from the source language phrase SP (1, 1)"到着してください".

At Step S803, the second-speech outputting unit 242 outputs the generated target language (English) phrase speech signal TPAO (1, 1) "Please arrive". At Step S804, the first-speech outputting unit 241 outputs the generated source language (Japanese) phrase speech signal SPAO (1, 1) "とうちゃくしてください". The target language phrase speech signal TPAO (1, 1) and the source language phrase speech signal SPAO (1, 1) correspond to a speech phrase pair 1102 in FIG. 11. As shown in FIG. 11, "とうちゃくしてください" and "Please arrive" are almost simultaneously outputted. The speech translating apparatus 100 according to the embodiment outputs the speech in this way so that correspondence is clear during output.

The source language phrase speech signal SPAO (1, 1) "とうちゃくしてください" and the target language phrase speech signal TPAO (1, 1) "Please arrive" form a phrase pair speech PPAO (1, 1).

Then, at Step S805, the speech-input receiving unit 201 waits for the inputted speech from the Japanese speaker or the English speaker during the output of the speeches. In this way, the speech-input receiving unit 201 detects the interrupting speech as required. In the example, the interruption does not occur until the output of the speeches is completed.

Figure 8:
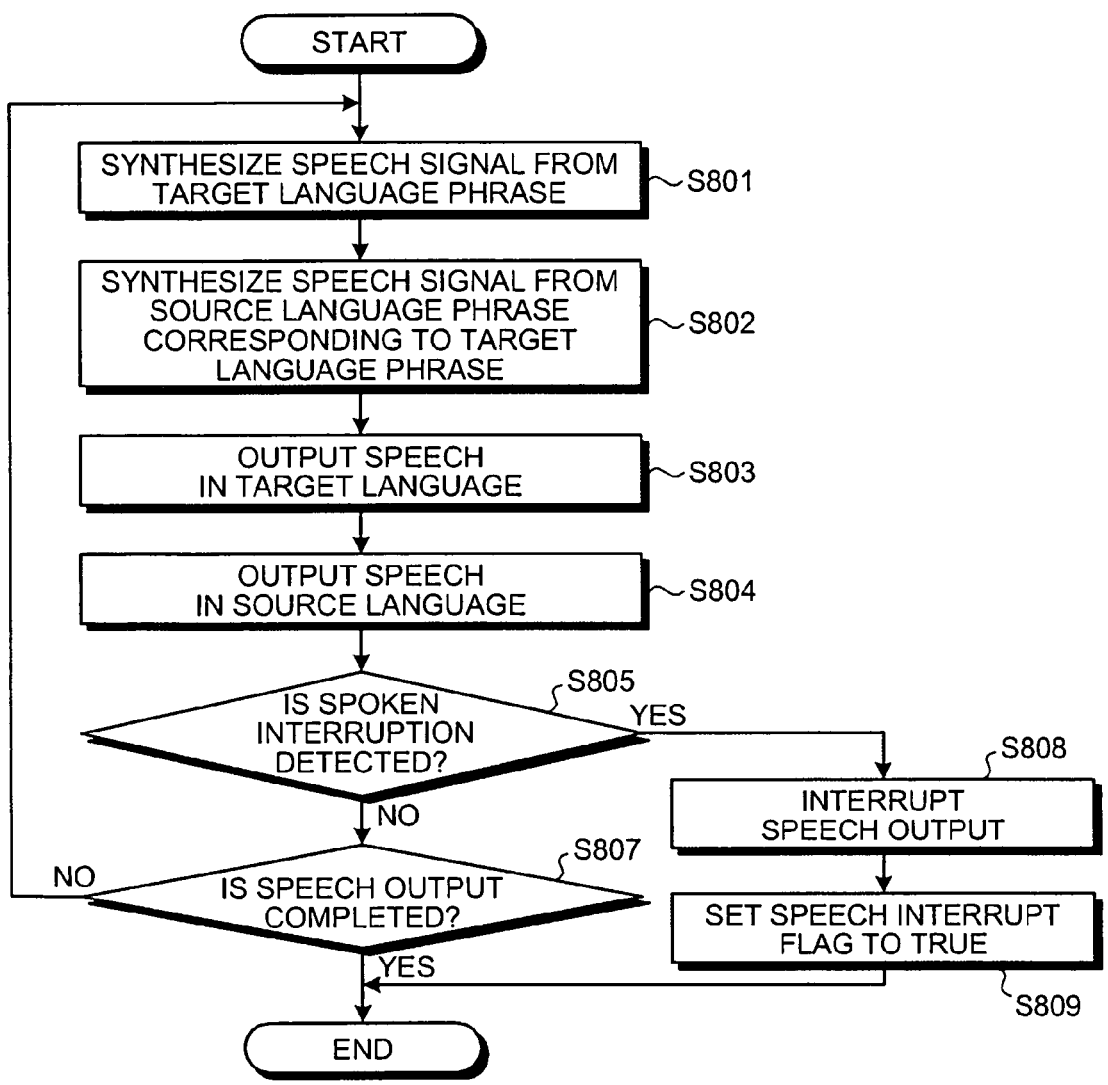
FIG. 8 is a flowchart performed when the speech translating apparatus according to the embodiment audibly outputs a phase pair in the phase pair set.

As a result, the process shown in FIG. 8 is completed, and the controlling unit 208 returns to the process in FIG. 6. At Step S608, the controlling unit 208 sets the pointer J1 to 2. This indicates that the next phrase pair to be processed has been changed to a phrase pair PP (1, 2).

At Step S609, the controlling unit 208 judges whether the interrupting speech has been detected during the process at Step S607 using the speech interrupt flag. At this stage, the speech input flag is 'False'. Therefore, the controlling unit 208 judges that the interruption has not occurred. The controlling unit 208 starts the process at Step S605 to output the phrase pair PP that has not been outputted.

Subsequently, the process is performed as performed previously. In other words, at Step S605, the controlling unit 208 judges that a pointer J2 (set to 2) is smaller than a phrase-pair total element number N2 (set to 3). The controlling unit 208 proceeds to Step S606 and sets the speech interrupt flag to 'False'.

At Step S607, a phrase pair PP (2, 2) is audibly outputted. The output is described in detail with reference to FIG. 8.

First, at Step S801, the English-speech synthesizing unit 252 generates a speech signal from a target language phrase TP (1, 2) "at Hiya and Hotel". At Step S802, the Japanese-speech synthesizing unit 251 generates a speech signal from a source language phrase SP (1, 2)" ひやっとほてるに ".

At Step S803, the second-speech outputting unit 242 outputs the generated target language (English) phrase speech signal TPAO (1, 2) "at Hiya and Hotel". Next, at Step S804, the first-speech outputting unit 241 outputs the generated source language (Japanese) phrase speech signal SPAO (1, 2) " ひやっとほてるに ". The target language phrase speech signal TPAO (1, 2) and the source language phrase speech signal SPAO (1, 2) correspond to an speech phrase pair 1103 in FIG. 11. As shown in FIG. 11, the speech signals are almost simultaneously outputted.

The speech outputted using the speech phrase pair PPAO (1, 2) differs from that of the previous speech phrase pair PPAO (1, 1) in that a speech recognition error is included. Therefore, the Japanese speaker acknowledges that the "ハイハットホテル" spoken by the Japanese speaker has not been correctly processed by the speech translating apparatus 100.

To correct " ひやっとほてるに ", the Japanese speaker interrupts the output and makes the inputted speech SAI2 "のはいはっとほてるです"(駅の近くのハイ" えきのちかく ハットホテルです). The inputted speech SAI2 made by the Japanese speaker corresponds to the inputted speech SAI2 indicated by a reference number 1104 in FIG. 11.

As a result, at Step S805 in FIG. 8, the speech-input receiving unit 201 detects the interrupting speech (Yes at Step S805). At Step S808, the controlling unit 208 interrupts the output of the phrase pair speech PPAO (1, 2) from the speech outputting unit 205. At Step S809, the controlling unit 208 sets the speech interrupt flag indicating whether there is an interruption to 'True'. Then, the controlling unit 208 returns to the process in FIG. 6.

At Step S609, the controlling unit 208 sets the pointer J1 to 3. Then, at Step S609, the controlling unit 208 judges the speech interrupt flag. Because the speech interrupt flag is set to "True", occurrence of an interrupting inputted speech SAI2 can be acknowledged. The controlling unit 208 generates a phrase pair PP from the inputted speech SAI2 in the same way as from the inputted speech SAI1. Then, the controlling unit 208 proceeds to Step S610 to output the speeches.

At Step S610, the controlling unit 208 sets the counter variable i to 2. While the counter variable i is set to 2, the controlling unit 208 processes the interrupting inputted speech SAI2.

At Step S603, the controlling unit 208 generates the interrupting inputted speech SAI2 from a source language text S2 "駅の近くのハイハットホテル" and a target language text T2 "Hyhat Hotel near the station". In this way, in the current process, "はいはっとほてる" is correctly recognized and "ハイハットホテル" is generated. Furthermore, a phrase pair set PPSET2 is generated from the source language text S2 and the target language text T2. The phrase pair set PPSET2 is stored in the phrase storing unit 207.

As shown in FIG. 5, the phrase pair set PPSET 2 includes a phrase pair PP (2, 1) [(1)Hyhat Hotel, (2)ハイハットホテルです] and a phrase pair PP (2, 2) [(2)near the station, (1)駅の近くの].

Then, at Step S604, the controlling unit 208 sets the pointer J2 to 1. At Step S605, the pointer J2 (set to 1) is smaller than the phrase-pair total element number N2 (set to 2). Therefore, the controlling unit 208 proceeds to Step S606.

Next, at Step S606, the controlling unit 208 sets the speech interrupt flag to 'False'. At Step S607, the controlling unit 208 generates a speech phrase pair PPAO (2, 1) from the phrase pair PP (2, 1). Then, the controlling unit 208 outputs a source language phrase speech signal SPAO (2, 1) "はいはっとほてる" included in the speech phrase pair PPAO (2, 1) to the Japanese speaker. The controlling unit 208 also outputs a target language phrase speech signal TPAO (2, 1) "Hyatt Hotel" included in the speech phrase pair PPAO (2, 1) to the English speaker. The speech phrase pair PPAO (2, 1) corresponds to a speech phrase pair 1105 in FIG. 11.

In other words, in the previous speech phrase pair PPAO (1, 2) indicated by the speech phrase pair 1103 in FIG. 11, the "ハイハットホテル" portion is recognized as "ひやっとほてる". As indicated by the speech phrase pair 1105 in FIG. 11, this time, the "ハイハットホテル" portion is correctly outputted as "はいはっとほてる". In this way, as a result of the Japanese speaker making the interrupting speech during the audio output, a misunderstanding with the English speaker caused by the speech recognition error can be prevented.

At Step S805 in FIG. 8, the speech input receiving unit 201 detects whether the interrupting speech has occurred. There is no interrupting speech at this stage.

At Step S608 in FIG. 6, the controlling unit 208 increases the pointer J2 by 1. The pointer J2 is set to 2. Then, at Step S609, the controlling unit 208 returns to Step S605 because the speech interrupt flag is "False".

Through the processes at Step S605 to Step S609, the controlling unit 208 processes the phrase pair PP (2, 2) and outputs a target language phrase speech signal TPAO "near the station" and a source language phrase speech signal SPAO "えきのちかくの". The target language phrase speech signal TPAO and the source language phrase speech signal SPAO correspond to a phrase pair 1106 in FIG. 11. No interrupting speech is made during the output of the speeches.

After the processes are completed, the controlling unit again returns to Step S605. At this stage, the pointer J2 is set to '3'. The phrase-pair element number N2 is set to '2'. Therefore, the controlling unit 208 proceeds to Step S611. In other words, the controlling unit 208 judges that a phrase pair PP (2, 3) is not present in the phrase storing unit 207 and all phrase pairs PP included in the phrase pair set PPSET2 have been outputted.

Then, at Step S611, the controlling unit 208 deletes the phrase pair set PPSET2 from the phrase storing unit 207. At Step S612, the controlling unit 208 decreases the counter variable i by '1' and returns to the process of the phrase pair set PPSET1 before the interruption.

Then, the controlling unit 208 judges whether the counter variable i is smaller than '1'. If the counter variable i is less than '0', the phrase pair set PPSET is not stored in the phrase storing unit 207. Therefore, the process is completed. However, the counter variable i is currently set to '1'. Therefore, the controlling unit 208 returns to Step S605.

At this stage, the counter variable i is '1'. The pointer J1 is set to 3. The phrase-pair total element number N1 is set to '3'.

In the processes from Step S605 to Step S609, a process using the last phrase pair PP (1, 3) [(3)by 3 p.m., (1) 午後3時までに] that has not been audibly outputted, indicated in a third line in FIG. 5, is performed. The phrase pair PP (1, 3) had been interrupted by the interrupting speech. In other words, as indicated by reference number 1107 in FIG. 11, procedures up to an output process of the speech phrase pair PPAO (1, 3) (by 3 p.m., ごごさんじまでに) are performed.

It is determined that no interruptions have occurred during the output of the speech phrase pair PPAO (1, 3). After the pointer J1 is increased by '1', the controlling unit 208 returns to Step S605. At this stage, the counter variable i is '1'. The pointer J1 is '4'. The phrase-pair total element number N1 is '3'. In other words, the controlling unit 208 judges that the pointer J1 is larger than the phrase-pair total element number N1 and proceeds to Step S611. As a result, the processing of all phrase pairs PP within the phrase pair set PPSET1 is completed.

At Step S611, the controlling unit 208 deletes the phrase pair set PPSET1. Then, at Step S612, the controlling unit 208 decreases the counter variable i by '1'. The counter variable i becomes '0'. At Step S613, the controlling unit 208 judges that the counter variable i is less than '1'. The controlling unit 208 judges that the phrase pair set PPSET is not present in the phrase storing unit 207. The process is completed.

As a result of the procedures described above being performed, the Japanese speaker can check for errors by listening to the source language speech. Because the source language speech and the target language speech are associated and outputted, misunderstandings and confusion do not occur even when the interrupting speech is made during the audio output. Furthermore, the English speaker can also interrupt the audio output, if the English speaker discovers an error or wishes to check for errors. Next, when the English speaker interrupts the output of a speech made by the Japanese speaker will be described.

A following situation is described. First, the Japanese speaker speaks. While the speech translating apparatus 100 audibly outputs the speech, a translation error occurs in the translation of the speech. To eliminate confusion caused by the translation error, the English speaker makes an interrupting speech.

As shown in FIG. 12, first, the first speech-input receiving unit 211 receives an inputted speech SAI1 "このかうんたーでえんではらってもいいですか" from the Japanese speaker. Then, the second speech-input receiving unit 212 receives an inputted speech "Circle, you mean coin", from the English speaker as an interruption. Next, after the speech by the English speaker is audibly outputted, the first speech-input receiving unit 211 receives an inputted speech "いいえにほんえんです" from the Japanese speaker.

In other words, in an example in FIG. 12, first, a translation error is made by the Japanese-speech recognizing unit 261 at input sequence 1. "円" is translated as "circle".

The English speaker interrupts the audio output with an inputted speech SAI2, "Circle, you mean coin?" as indicated in input sequence 2, because the English speaker cannot understand the meaning of "circle".

Then, the Japanese speaker responds to the English speaker with "いいえ 日本円です", as indicated in input sequence 3. A situation such as that described above is assumed in FIG. 12.

As shown in FIG. 13, the phrase storing unit 207 stores the phrase pair set PPSET1 to phrase pair set PPSET3. The phrase pair set PPSET1 to phrase pair set PPSET3 are generated from the inputted speech SAI1 to inputted speech SAI3 inputted in the input sequence 1 to input sequence 3 in FIG. 12.

Then, in the sequence shown in FIG. 14, the speech translating apparatus 100 outputs the phrase pairs PP in the phrase pair set PPSETi shown in FIG. 13.

Next, procedures performed to output the speech phrase pairs according to the time chart shown in FIG. 15 will be described with reference to FIG. 6.

First, at Step S601, the controlling unit 208 sets the counter variable i to '1'. Then, the first speech-input receiving unit 211 detects the first speech from the Japanese speaker. The reception of the input from the English speaker is stopped. As indicated by reference number 1501 in FIG. 15, the Japanese speaker inputs the inputted speech SAI1 "えんではらってもいいですか" into the microphone 10. Then, at Step S602, the first speech-input receiving unit 211 receives the inputted speech SAI1.

Next, the Japanese-speech recognizing unit 261 correctly recognizes the inputted speech SAI1 and generates a source language text S1 "円で払ってもいいですか". The mechanical translating unit 203 mechanically translates the source language text S1. When performing the mechanical translation, the mechanical translating unit 203 mistakenly translates "円で" in the source language text S1 as "with a circle", when "円で" should be translated as "by yen". As a result, the mechanical translating unit 203 generates a target language text T1 "May I pay with a circle?".

The phrase aligning unit 204 performs the alignment process after respectively dividing the source language text S1 and the target language text T1 into phrases. As a result, the phrase pair set PPSET1 shown in FIG. 13 is stored in the phrase storing unit 207. (The above-described procedures are Step S603).

Then, at Step S604, the controlling unit 208 sets the pointer J1 to 1. In the processes at Step S605 to Step S609, the speech translating apparatus 100 outputs a speech phrase pair PPAO (1, 1) from a phrase pair PP (1, 1) stored in the phrase storing unit 207. The outputted speech phrase pair corresponds to a speech phrase pair 1502 in FIG. 15.

The controlling unit 208 judges that the interrupting speech has not been made while the speech phrase pair 1502 is being outputted. The controlling unit 208 returns to Step S605. At this stage, the counter variable i is '1'. The pointer J1 is '2'. The phrase-pair total element number N1 is '3'. The speech translating apparatus 100 processes a phrase pair PP (1, 2) and outputs a speech phrase pair PPAO (1, 2). The outputted speech phrase pair corresponds to a speech phrase pair 1503 in FIG. 15.

A target language phrase TP (1, 2) "with a circle" is a translation error. The English speaker who hears a target language phrase speech signal TPAO (1, 2) "with a circle" included in the speech phrase pair 1503 finds the phrase inappropriate for a conversation scene (a conversation regarding payment).

Therefore, the English speaker makes an interrupting inputted speech SAI2 "Circle, you mean coin?" (円って硬貨のことですか?) during the audio output of the speech phrase pair 1503 to confirm what the English speaker has heard. The interrupting inputted speech SAI2 corresponds to reference number 1504 in FIG. 15.

As a result, the second speech-input receiving unit 212 receives the interrupting inputted speech SAI2. At Step S609 in FIG. 6, the speech interrupt flag is set to 'True'.

At Step S609, the controlling unit 208 judges that the speech interrupt flag is set to 'True'. The controlling unit 208 proceeds to Step S610 and sets the counter variable i to '2'.

Then, at Step S603, the controlling unit 208 generates a source language text S2 "Circle, you mean coin?" and a target language text T2 "円って硬貨のことですか?" from the inputted speech SAI2. The phrase aligning unit 204 respectively divides the source language text S2 and the target language text T2 into phrases and performs the alignment process on each divided phrase. In this way, a phrase pair set PPSET2 is generated. The generated phrase pair set PPSET2 is stored in the phrase storing unit 207. A record stored in the phrase storing unit 207 is shown in a fourth record (PP (2, 1)) and a fifth record (PP (2, 2)) in FIG. 13.

Then, the speech translating apparatus 100 repeats the processes at Step S604 to Step S609, thereby performing an audio output process and the like using a phrase pair PP (2, 1) and a phrase pair PP (2, 2) in the phrase pair set PPSET 2. The speeches outputted as a result of these processes correspond to a speech phrase pair 1505 and a speech phrase pair 1506 in FIG. 15.

As a result of the processes above, the speech translating apparatus 100 audibly outputs a translation result "円って硬貨のことですか?" of the inputted speech SAI2 to the Japanese speaker.

The Japanese speaker has already heard the source language phrase speech signal SPAO (1, 2) "えんで". Therefore, the Japanese speaker has already confirmed that the speech made by the Japanese speaker has been correctly recognized by the speech translating apparatus 100. The "えんで" is included in the speech phrase pair 1503 in FIG. 15.

Therefore, the Japanese speaker can confirm that the "円で" portion included in the inputted speech SAI1 made by the Japanese speaker has not been correctly communicated to the English speaker because of a translation error or the like.

For example, after the inputted speech SAI2 is audibly outputted, the Japanese speaker makes a inputted speech SAI3 "いいえにほんえんです" (いいえ、日本円です). In other words, by replacing "円" with another expression "日本円", the Japanese speaker attempts to eliminate the misunderstanding regarding "円で". The inputted speech SAI3 is indicated by reference number 1507 in FIG. 15.

At Step 603 in FIG. 6, the speech translating apparatus 100 performs the speech recognition process on the inputted speech SAI3 and generates a source language text S3 "いいえ日本円です". Then, although the speech translating apparatus 100 has mistakenly translated "円で" in the source language text S1 as "circle", the speech translating apparatus 100 correctly generates a target language text T3 "No, Japanese yen" from the source language text S3. The speech translating apparatus 100 correctly generates the target language text T3 using a known method. Explanation thereof is omitted.

At Step S603, the speech translating apparatus 100 generates a phrase pair set PPSET3 from the source language text S3 and the target language text T3. The phrase pair set PPSET3 corresponds to a sixth record (PP (3, 1)) and a seventh record (PP (3, 2)) in FIG. 13. Then, the speech translating apparatus 100 stores the phrase pair set PPSET3 in the phrase storing unit 207. As a result, the process at Step S603 is completed.

The speech translating apparatus 100 performs further processing. By repeatedly performing the process at Step S609, the speech translating apparatus 100 outputs a speech phrase pair PPAO (3, 1) and a speech phrase pair PPAO (3, 2). The outputted speech phrase pairs PPAO correspond to a speech phrase pair 1508 and a speech phrase pair 1509 in FIG. 15.

Then, the speech translating apparatus 100 resumes the processing of the phrase pair set PPSET1 by performing the processes at Step S605 and Step S611 to Step S613.

The processes up to the output process of the speech phrase pair PPAO (1, 3) within the phrase pair set PPSET1 have already been completed. Therefore, the speech translating apparatus 100 performs a process using the phrase pair PP (1, 3). In other words, the speech translating apparatus 100 performs the processes at Step S605 to S606 and outputs a speech phrase pair PPAO (1, 3). The outputted speech phrase pair corresponds to a speech phrase pair 1510 in FIG. 15.

As a result of such processes being performed, an intention of the Japanese speaker "to pay in Japanese yen" is communicated to the English speaker regardless of the error by the speech translating apparatus 100. The speech translating apparatus 100 determines that there are no more interrupting inputted speeches and completes the process shown in FIG. 6.

In the speech translating apparatus 100 according to the above embodiment, a user can check a content of the target language phrase being outputted as the target language phrase in the source language by checking the source language phrase. A source language speaker can check all contents that have been recognized. Therefore, the source language speaker can accurately detect the speech recognition errors made by the speech translating apparatus 100. Moreover, because the source language phrase and the target language phrase are simultaneously outputted, a procedure in which a recognized content is outputted to the English speaker after the Japanese speaker has checked the content is not required.

In this way, time required for the user to check for errors and the like, after the reception of the inputted speech in the source language until the output of the target language phrase group that has been translated into the target language is not required. Therefore, the conversation can proceed appropriately. As a result, a time lag can be reduced.

In the speech translating apparatus 100 according to the above-described embodiment, the source language speaker can check for the speech recognition errors and the like while the target language phrase TP is being outputted by speech after the source language speaker has spoken, by the source language phrase SP associated with the target language phrase TP being audibly outputted. The source language speaker does not check for the errors and the like between when the source language speaker has spoken and when the target language phrase TP is outputted. Therefore, a delay in the conversation can be prevented.

When the source language phrase SP and the target language phrase TP are audibly outputted, the speech translating apparatus 100 can receive the interrupting speech from either the source language speaker or a target language speaker. When the source language speaker and the target language speaker make an interrupting speech to make an inquiry, a correction, or the like regarding the translation error, the speech recognition error, or the like, the speech translating apparatus 100 preferentially translates the interrupting speech and outputs the speech. The source language speaker and the target language speaker are always listening to a same portion of the source language speech and the target language speech. Therefore, the source language speaker and the target language speaker can infer where a problem has occurred. As a result, misunderstandings and the like occurring between the source language speaker and the target language speaker can be prevented.

The speech translating apparatus 100 according to the embodiment resumes an original audio output after the interrupting speech has been completed. Therefore, the speaker is not required to make a same speech. A load placed on the speaker can be reduced.

The speech translating apparatus according to the embodiment had been described above, with details of the procedures that are performed. However, the invention is not limited thereto. In a practical phase, the invention can be actualized by modifications being made to constituent elements without departing from the scope of the invention. Various inventions can also be formed through suitable combinations of a plurality of constituent elements disclosed according to the above-described embodiment. For example, a number of constituent elements can be deleted from all constituent elements disclosed according to the embodiment. Furthermore, constituent elements according to a different embodiment may be suitably combined. Some examples have been given within the procedures described above. Other examples according to other possible embodiments will be described hereafter.

As a translation method used according to the embodiment, a transfer method has been described. In the transfer method, the conversion is performed using the lexicon and the structure conversion rules. However, the translation method is not limited to the transfer method. For example, an example-using method or the like can be used. In the example-using method, an example having a high degree of similarity with an inputted text is selected from examples of corresponding translations.

In a first variation example, a translation method other than the transfer method is used. In the example, a method differing from the above-described method is used for phrase alignment. Various known methods, such as that using co-occurrence probability of words and phrases between two languages, can be used for phrase alignment. The various known methods can be used in the first variation example.

A technology described in JP-A 2004-38976 (KOKAI) is an example of a technology such as that described above. In the disclosed technology, a word alignment is performed by the degree of similarity between words being measured using a bilingual lexicon. The measured degree of similarity serves as a marker used to perform a phrase alignment. A segment within a target language text having a highest degree of coincidence with a source language phrase is extracted. The technology is designed so that discontinuous segments can also be extracted. The phrase aligning unit of the speech translating apparatus can use various phrase aligning methods as described above.

According to the embodiment described above, the process is described in which the source language speaker and the target language speaker perform an interruption during an audio output. However, the process does not differ depending on which speaker, between the source language speaker and the target language speaker, speaks. In the first variation example, the process is changed depending on which speaker, between the source language speaker and the target language speaker, speaks.

In the first variation example, the interrupting speech is presumed to be a speech indicating a correction, an inquiry, or the like made regarding a phrase or the like that is being outputted, when an error occurs in a speech recognition result or a translation result. The source language speaker interrupts the audio output when the source language speaker confirms that the error has occurred in the speech recognition result. When only the target language speaker interrupts the audio output, the error has occurred in the translation result. When both the source language speaker and the target language speaker interrupt the audio output, the error has occurred in the speech recognition result.

By incorporating the above-described conditions in the process, the speech translating apparatus of the first variation example can improve the speech recognition result of a repeated speech or allow a better selection of translation candidates using information on a phrase that has been interrupted or phrases before and after the interrupted phrase.

Numerous methods are proposed for improving speech recognition and translation accuracy using a speech history, such as that described above. For example, in JP-A 2003-316386 (KOKAI), a method is proposed in which a matching portion between an initial speech and a correction speech is automatically detected and processing is performed using the speech history of the matching portion. As a result, a more appropriate selection of recognition candidates can be provided.

For example, an example will be described in which the speech translating apparatus of the first variation example receives an inputted speech "午後3時までに早くホテルに到着してください" from the Japanese speaker. The speech translating apparatus makes an error in recognizing the inputted speech "午後3時までに早くホテルに到着してください" and generates a source language text "午後3時までに/早く/ホテルに/当社を/ください". The speech translating apparatus generates a target language text "Give/this company/to the hotel/by 3 p.m./soon".

The speech translating apparatus audibly outputs following phrase pairs to the target language (English) speaker and the source language (Japanese) speaker, in sequence: a speech phrase pair (1) (Give, ください), a speech phrase pair (2) (this company, 当社を), a speech phrase pair (3) (to the hotel, ホテルに), a speech phrase pair (4) (by 3 p.m., 午後3時までに), and a speech phrase pair (5) (soon, 早く).

When the Japanese speaker hears "当社を" during an output of the speech phrase pair (2), the Japanese speaker infers that a "到着してください" portion has not been correctly recognized. The Japanese speaker makes an interrupting speech "到着してください".

When the speech translating apparatus receives a interrupting inputted speech "到着してください", the speech translating apparatus references phrases before and after "当社を" in the source language (Japanese) text. The speech translating apparatus detects a text "到着してください" indicating a result of a recognition process performed on the interrupting inputted speech and detects a similar portion "到着してください" from within the original source language text.

The speech recognizing unit of the speech translating apparatus gives priority to recognition candidates other than "到着してください" used in the recognition process of the previous speech and replaces the portion with a new recognition result, "到着してください".

The speech translating apparatus does not re-translate only the replaced portion but, rather, re-translates an entire source language text after the replacement. The speech translating apparatus generates the target language text. As a result, the speech translating apparatus can acquire a target language text "Please arrive at Hyhat Hotel by 3 p.m.".

Next, the speech translating apparatus audibly outputs phrases within a phrase pair set generated from the re-generated source language text and target language text, in sequence, starting with a speech phrase pair (1) (arrive, 到着してください).

In the first variation example described above, the speech translating apparatus compares the original source language text with the text indicating the recognition result of the interrupting inputted speech. However, the translation method is not limited to such comparisons. For example, similar portions can be detected by speech signal levels being matched. As a result, the accuracy can be further enhanced.

In the first variation example, the erroneous portion is detected at a start of the target language text. However, the same process can be performed when the erroneous portion is detected midway through the target language text.

In the first variation example, the speech translating apparatus makes the error in the speech recognition of the inputted speech by the source language speaker. However, the speech translating apparatus of the first variation example can also be used when the target language speaker makes the interrupting speech when a mistranslation occurs in the translation process performed on the inputted speech.

As explained according to the above-described embodiment, when the speech translating apparatus receives the inputted speech "円で" from the source language speaker, the speech translating apparatus translates "円で" as "circle", regardless of "円で" being required to be translated as "yen".

As in the above-described embodiment, a process performed when the English speaker makes an interrupting speech "Circle, you mean coin?" while the speech translating apparatus is outputting the speech phrase pair (with circle, 円で) will be described.

For example, a plurality of corresponding translation candidates for "円" are held in a translation lexicon stored in the speech translating apparatus. A first priority candidate is "circle". A second priority candidate is "yen". The speech translating apparatus selects the first priority candidate "circle" through the translation process performed on the inputted speech from the source language speaker.

The speech translating apparatus detects the interrupting speech from the English speaker and judges that the above-described translation may be erroneous. Therefore, when "円" is included in a next inputted speech from the source language speaker, the speech translating apparatus selects the second priority candidate "yen" as the translation and outputs the selected candidate.

Furthermore, the speech translating apparatus can compare a degree of semantic similarity between the corresponding translation candidate of the phrase "円" included in the initial source language text and a phrase "coin" included in the interrupted text.

For example, the speech translating apparatus compares a calculated degree of similarity between "circle" and "coin" with a calculated degree of similarity between "yen" and "coin". The speech translating apparatus determines "yen" having a higher degree of similarity with "coin" to be a selection candidate for the corresponding translation.

As a result of a variation example such as that described above being incorporated into the speech translating apparatus, when the speech recognition error or the translation error occurs in the speech, a correction result can be outputted afterwards without the user having to specify a location of the speech recognition error or the translation error.

Certain phrases such as "you mean . . . " and "is it . . . " indicating an inquiry can be registered in the speech translating apparatus. When the phrases are inputted, the speech translating apparatus can judge that the speech recognition error or the translation error has occurred.

In this way, the speech translating apparatus performs the methods in the above-described first variation example. The speech translation device detects the speech recognition error by identifying the matching portion between the interrupting speech and the original speech. The speech translating apparatus detects the translation error by using the degree of similarity or the like. As a result, translation accuracy of the speech translating apparatus can be enhanced. The translation error and the speech recognition error can be corrected without the user being required to perform an operation. Therefore, usability is enhanced.

According to the above-described embodiment and the first variation example, the speech translating apparatus processes the interrupting speech while outputting the speech phrase pair as a speech made to eliminate misunderstanding caused by the translation error or the speech recognition error in the phrase being outputted. However, the interrupting speech is not limited to a speech such as this.

According to the embodiment, the speech translating apparatus provides the source language speaker with a feedback of the speech recognition result of the inputted speech. However, the speech translating apparatus is not limited to performing a feedback such as this.

In the speech translating apparatus of the first variation example, after the source language text generated from the inputted speech is translated and the target language text is generated, the target language text is further re-translated (reverse-translated) back to the source language. A result of the re-translation is added to an output made to the source language speaker.

When the speech translating apparatus of the first variation example audibly outputs the speech recognition result to the speaker, the speech translating apparatus adds noise to a phrase in the outputted speech of which a difference between the result of the internally-processed reverse translation and the result of the speech recognition is significant and outputs the phrase. As a result, the speech translating apparatus can notify the user of a possibility of a translation error when the user listens to the outputted speech.

For example, when the speech translating apparatus generates a target language text "May I pay/with circle?" from an inputted speech "円で/払ってい払っていいですか?" from the source language speaker, the speech translating apparatus reverse-translates the generated target language text and generates a source language text "円周で/払っていいですか?".

The speech translating apparatus compares the original speech recognition result "円で/払っていいですか?" and the re-translated source language text "円周で/払っていいですか?" by each phrase. In other words, the speech translating apparatus first compares "円周で" and "円で", then compares "払っていいですか?" and "払っていいですか?". The speech translating apparatus calculates a degree of coincidence between "円周で" and "円で" to be 60 percent. The speech translating apparatus calculates the degree of coincidence between "払っていいですか?" and "払っていいですか?" to be 100 percent. A threshold of the degree of coincidence is set to 70 percent.

The speech translating apparatus outputs the phrases (円周で, with circle) based on a main speech recognition to the speakers. However, the degree of coincidence of the phrases is less than the threshold. Therefore, the noise is added to the phrase.

In other words, even when a reverse translation result differs from the content of the original speech, this does not necessarily indicate a translation error. When all reverse translation results are outputted to the user and checked, the translation error caused by the reverse translation occurs. Therefore, although a load placed on the user increases, advantageous effects are only slightly improved.

Therefore, the speech translating apparatus outputs the speech recognition result to the user as the content of the speech and adds the noise when the degree of coincidence after the reverse translation is lower than the threshold. As a result, the speech translating apparatus can efficiently communicate a degree of accuracy regarding the translation of the phrase to the user.

Using the method described above, the speaker can simultaneously receive information on the reverse translation result with the text that has been recognized by the speech translating apparatus. As a result, even when the user listens to the source language phrase and judges that the speech recognition result is correct, the user can be notified of the possibility that an error has occurred by listening to the noise added to the phrase.

The source language speaker can judge that the translation error has occurred if a phrase is judged to have significant noise. Therefore, the source language speaker can speak using a different expression for the phrase and eliminate the misunderstanding with the target language speaker caused by the translation error. As a result, the conversation can be carried out very smoothly.

According to the embodiment, the speech translating apparatus simultaneously outputs the source language phrase and the target language phrase. However, an output method is not limited thereto. For example, the speech translating apparatus can output the source language phrase to the source language speaker before outputting the target language phrase to the target language speaker. As a result, the source language speaker can make corrections before the target language speaker listens to the target language phrase. In this way, the time lag can be provided between the output of the target language phrase and the source language phrase.

According to the above-described embodiment, the speech translating apparatus outputs the source language phrase and the target language phrase by speech. However, the output method is not limited thereto.

An example in which the speech translating apparatus outputs the source language phrase and the target language phrase using a display unit will be described as a second variation example. In the second variation example, the speech translating apparatus is a compact, portable terminal. A liquid crystal display is provided on both surfaces of the terminal. When the speech translating apparatus receives the inputted speech from the speaker, the speech translating apparatus displays the source language phrase on one surface and the target language phrase on the other surface. The source language speaker references the source language phrase on the one surface and the target language speaker references the target language phrase on the other surface. Regarding interruption processes and the like, the interruption can be received through the interrupting speech, as in the above-described embodiment.

In the speech translating apparatus of the second variation example, the source language phrase and the target language phrase are displayed at a timing simultaneous with a timing at which the speeches are outputted in the above-described embodiment and the first variation example. Therefore, same effects as those according to the embodiment and the first variation example can be achieved.

According to the embodiment, two people, the source language speaker and the target language speaker, are presumed to be using the speech translating apparatus. However, t a number of people who can use the speech translating apparatus is not limited to two people. The speech translating apparatus according to the embodiment can be expanded to allow use by a large number of people.

According to the embodiment, when the speech translating apparatus receives the interrupting inputted speech, the speech translating apparatus can generate as many levels of interruption by the inputted speech as required. When many interruption levels are generated in this way, even when the speech translating apparatus recursively returns to the original speech, benefits of returning to the original speech may decrease as a result of the user having already forgotten the content of the original speech or communication having already been completed.

Therefore, the speech translating apparatus can automatically cancel the original speech. A button or the like for canceling the original speech can be provided on the speech translating apparatus, and the speaker can manually cancel the original speech.

As a result, situations can be handled, such as when a topic between the speakers changes during the interruption or when the speech recognition is determined to be erroneous upon the outputted speech from the speech translating apparatus being heard.

Figure 16:
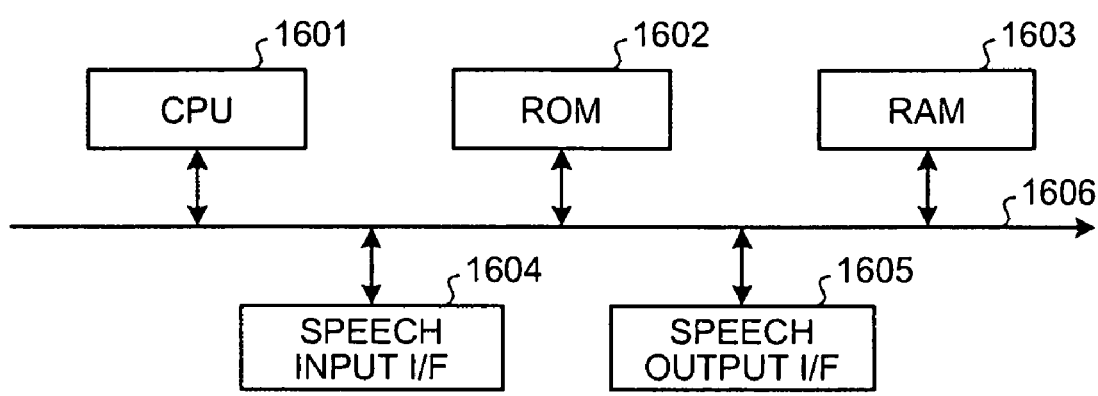
FIG. 16 is a diagram of a hardware configuration of the speech translating apparatus.

As shown in FIG. 16, a hardware configuration of the speech translating apparatus includes a read-only memory (ROM) 1602, a central processing unit (CPU) 1601, a random-access memory (RAM) 1603, a speech input interface (I/F) 1604, and a speech output I/F 1605 that are interconnected by a bus 1606. The ROM 1602 stores a speech translating program and the like in the speech translating apparatus. The CPU 1601 controls each component of the speech translating apparatus according to programs within the ROM 1602. The RAM 1603 stores various data required to control the speech translating apparatus. The speech signals from the speakers are inputted into the speech input I/F 1604. The speech output I/F 1605 outputs the speech signals to the speakers. The speech translating apparatus can be applied to a common computer including the above-described configuration.

The speech translating program run by the speech translating apparatus according to the embodiment is provided stored on a computer-readable recording medium, such as a compact-disc read-only memory (CD-ROM), a flexible disk (FD), a compact disc-recordable (CD-R), and a digital versatile disk (DVD). The speech translating program is stored as a file in an installable format or an executable format.

The speech translating program is read from the recording medium in the speech translating apparatus and is executed. As a result, the speech translating program is loaded onto a main storing device. Each component described with reference to a software configuration, described above, is generated in the main storing device.

The speech translating program run by the speech translating apparatus according to the embodiment can also be stored on a computer connected to a network, such as the Internet. The speech translating program can be provided by being downloaded via the network. The speech translating program run by the speech translating apparatus according to the embodiment can also be provided or distributed via the network, such as the Internet.

The speech translating program according to the embodiment can also be provided by being included in the ROM or the like in advance.

The speech translating program run by the speech translating apparatus according to the embodiment has a modular configuration including the above-described components. Regarding actual hardware, each component is loaded on to the main storing device as a result of the CPU (processor) reading the speech translating program from the recording medium and running the read program. Then, each component is generated in the main storing device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech translating apparatus comprising:
a processor;
a memory storing computer-executable instructions for execution by the processor;
an input unit that inputs a speech in a first language;
a speech recognizing unit that recognizes the speech and generates a first text;
a translating unit that translates the first text into a second language and generates a second text;
a first dividing unit that divides the first text into one or more first phrases;
a second dividing unit that divides the second text into one or more second phrases;
an associating unit that associates, as a phrase pair, a second phrase of the one or more second phrases with a first phrase from the one or more first phrases that is semantically equivalent to the second phrase;
a storing unit that stores a plurality of associated phrase pairs as a phrase pair set; and
an output unit that outputs, from the phrase pair set, the phrase pair of the second phrase and the first phrase associated with the second phrase in the phrase pair according to the order of appearance of the second phrase in the second text, such that the phrase pair is output in a phrase order of the second text; wherein the input unit inputs replacement speech while the output unit is outputting the phrase pair; and the output unit interrupts the output of the phrase pair when the input unit inputs the replacement speech, outputs the replacement speech, and following output of the replacement speech, resumes output of the remaining phrase pairs from the phrase pair set according to the phrase order of the second text.

2. The apparatus according to claim 1, wherein the outputting unit outputs the phrase pair of the second phrase and the first phrase almost simultaneously.

3. The apparatus according to claim 1, further comprising:
a first speech synthesizing unit that synthesizes a speech signal from the first phrase, wherein
the outputting unit outputs the speech signal of the first phrase.

4. The apparatus according to claim 1, further comprising:
a second speech synthesizing unit that synthesizes a speech signal from the second phrase, wherein
the outputting unit outputs the speech signal of the second phrase.

5. The apparatus according to claim 1, wherein
the associating unit associates each second phrase in the second language with the first phrase in the first language semantically equivalent to the second phrase, and
the outputting unit outputs the second phrase in the second language and the first phrase in the first language associated with the second phrase by the associating unit in a phrase order within the second text.

6. The apparatus according to claim 1, wherein the associating unit associates a single second phrase with a plurality of the first phrases semantically equivalent to the second phrase.

7. A computer-implemented speech translating method comprising:
executing, by a processor of a computer, the steps of:
inputting a speech in a first language;
recognizing the speech and generating a first text;
translating the first text into a second language and generating a second text;
first dividing the first text into one or more first phrases;
second dividing the second text into one or more second phrases;
associating, as a phrase pair, a second phrase of the one or more second phrases with a first phrase of the one or more first phrases that is semantically equivalent to the second phrase;
storing a plurality of associated phrase pairs as a phrase pair set;
outputting, from the phrase pair set, the phrase pair of the second phrase and the first phrase associated with the second phrase in the phrase pair according to the order of appearance of the second phrase in the second text, such that the phrase pair is output in a phrase order of the second text;
inputting a replacement speech while outputting the phrase pair;
interrupting the outputting of the phrase pair when the replacement speech is input;
outputting the replacement speech; and
resuming output of the remaining phrase pairs from the phrase pair set according to the phrase order of the second text when outputting of the replacement speech is completed.

8. The method according to claim 7, wherein
each second phrase in the second language is associated in the associating with the first phrase in the first language semantically equivalent to the second phrase, and
the second phrase in the second language and the first phrase in the first language associated with the second phrase in the associating are outputted in a phrase order within the second text.

9. A computer program product having a computer readable medium including programmed instructions for performing a translation process to an input speech, wherein the instructions, when executed by a computer, cause the computer to perform:
inputting a speech in a first language;
recognizing the speech and generating a first text;
translating the first text into a second language and generating a second text;
first dividing the first text into one or more first phrases;
second dividing the second text into one or more second phrases;
associating, as a phrase pair, a second phrase of the one or more second phrases with a first phrase of the one or more first phrases that is semantically equivalent to the second phrase;
storing a plurality of associated phrase pairs as a phrase pair set;
outputting, from the phrase pair set, the phrase pair of the second phrase and the first phrase associated with the second phrase in the phrase pair according to the order of appearance of the second phrase in the second text, such that the phrase pair is output in a phrase order of the second text;
inputting a replacement speech while outputting the phrase pair;
interrupting the outputting of the phrase pair when the replacement speech is input;
outputting the replacement speech; and
resuming output of the remaining phrase pairs from the phrase pair set according to the phrase order of the second text when outputting of the replacement speech is completed.

* * * * *